United States Patent [19]
Matsubara et al.

[11] Patent Number: 6,007,182
[45] Date of Patent: *Dec. 28, 1999

[54] INK-JET RECORDING METHOD EMPLOYING INKS OF DIFFERENT CHARACTERISTICS AND APPARATUS THEREFOR

[75] Inventors: Miyuki Matsubara, Tokyo; Takayuki Fujita, Inagi; Hiromitsu Hirabayashi, Yokohama; Tetsurou Inoue, Tokyo; Makoto Aoki, Yokohama; Masaya Kikuta, Tokyo; Jiro Moriyama; Shigeyasu Nagoshi, both of Kawasaki; Mayumi Yamamoto, Tokyo; Noribumi Koitabashi, Yokohama; Yoshihisa Takizawa, Kawasaki; Toshiharu Inui; Hideto Yokoi, both of Yokohama; Hitoshi Sugimoto, Kawasaki; Fumihiro Gotoh, Yokohama; Masaya Uetuki, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,108

[22] Filed: Dec. 16, 1996

Related U.S. Application Data

[63] Continuation of application No. 08/094,894, Jul. 22, 1993, abandoned.

[30] Foreign Application Priority Data

| Jul. 24, 1992 | [JP] | Japan | 4-198656 |
| Jul. 31, 1992 | [JP] | Japan | 4-205548 |
| Oct. 30, 1992 | [JP] | Japan | 4-292542 |
| Oct. 30, 1992 | [JP] | Japan | 4-293010 |
| Oct. 30, 1992 | [JP] | Japan | 4-293022 |

[51] Int. Cl.$^6$ .............................. B41J 2/21; G01D 11/00
[52] U.S. Cl. ............................................. 347/43; 347/100
[58] Field of Search ............................ 347/43, 100, 102, 347/95

[56] References Cited

U.S. PATENT DOCUMENTS

| 4,469,026 | 9/1984 | Irwin | 347/102 X |
| 4,952,943 | 8/1990 | Iwata et al. | 347/100 |
| 5,168,552 | 12/1992 | Vaughn et al. | 315/109 |
| 5,220,342 | 6/1993 | Moriyama | 347/43 |
| 5,241,396 | 8/1993 | Harrington | 358/296 |
| 5,477,248 | 12/1995 | Sugimoto et al. | 347/43 |

FOREIGN PATENT DOCUMENTS

| 288043 | 12/1987 | Japan | 347/102 |
| 4-147866 | 5/1992 | Japan | 347/100 |

*Primary Examiner*—N. Le
*Assistant Examiner*—L. Anderson
*Attorney, Agent, or Firm*—Fitzpatrick, Cella, Harper & Scinto

[57] ABSTRACT

There are provided a color image forming method with liquids, capable of ensuring sharpness and high density in basically all the color images, and a recording apparatus therefor. This invention employs a black ink of relatively superior diffusibility and color inks of relatively superior penetrability, different in color from the black ink, and is characterized by forming the boundary area of a black image area with the color inks instead of the black ink.

48 Claims, 34 Drawing Sheets

FIG. 4

| #1 | CMY | CMY |
|---|---|---|
|  | CMY | CMY |

| #5 | CM | CY |
|---|---|---|
|  | MY | CM |

| #2 | CMY | M |
|---|---|---|
|  | M | CMY |

| #6 | CMY |  |
|---|---|---|
|  |  | CMY |

| #3 | CM | MY |
|---|---|---|
|  | MY | CM |

| #7 | MY | C |
|---|---|---|
|  | C | MY |

| #4 | CM | CY |
|---|---|---|
|  | CY | CM |

| #8 | CMY | Bk' |
|---|---|---|
|  | Bk' | CMY |

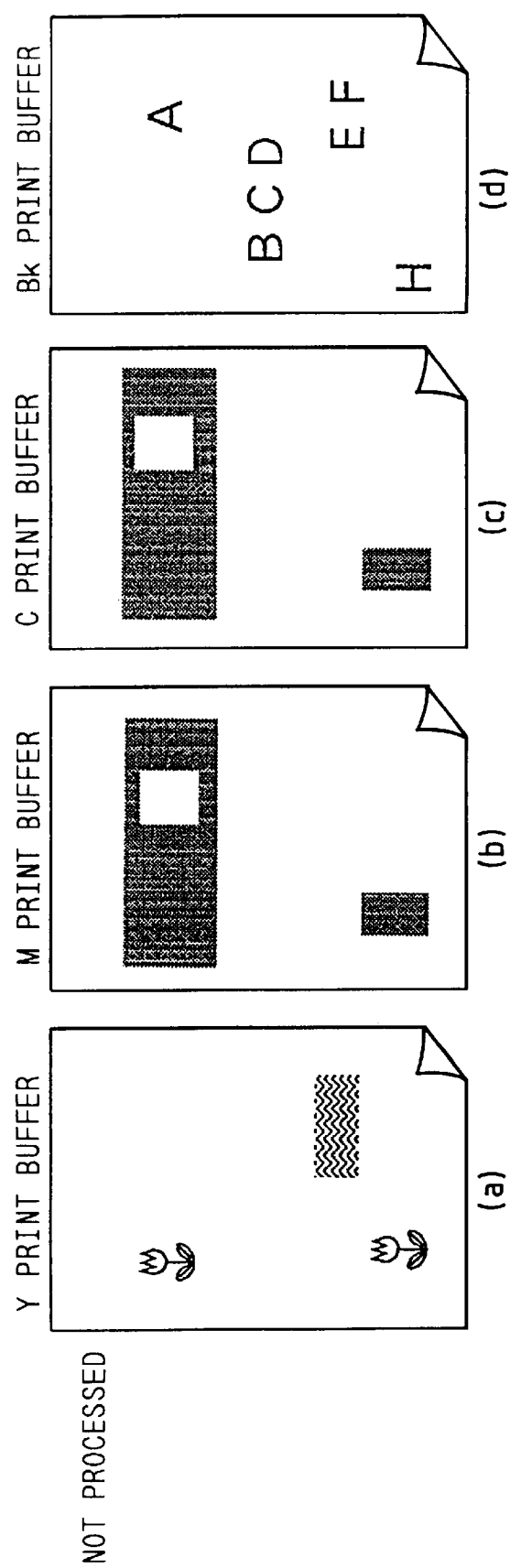

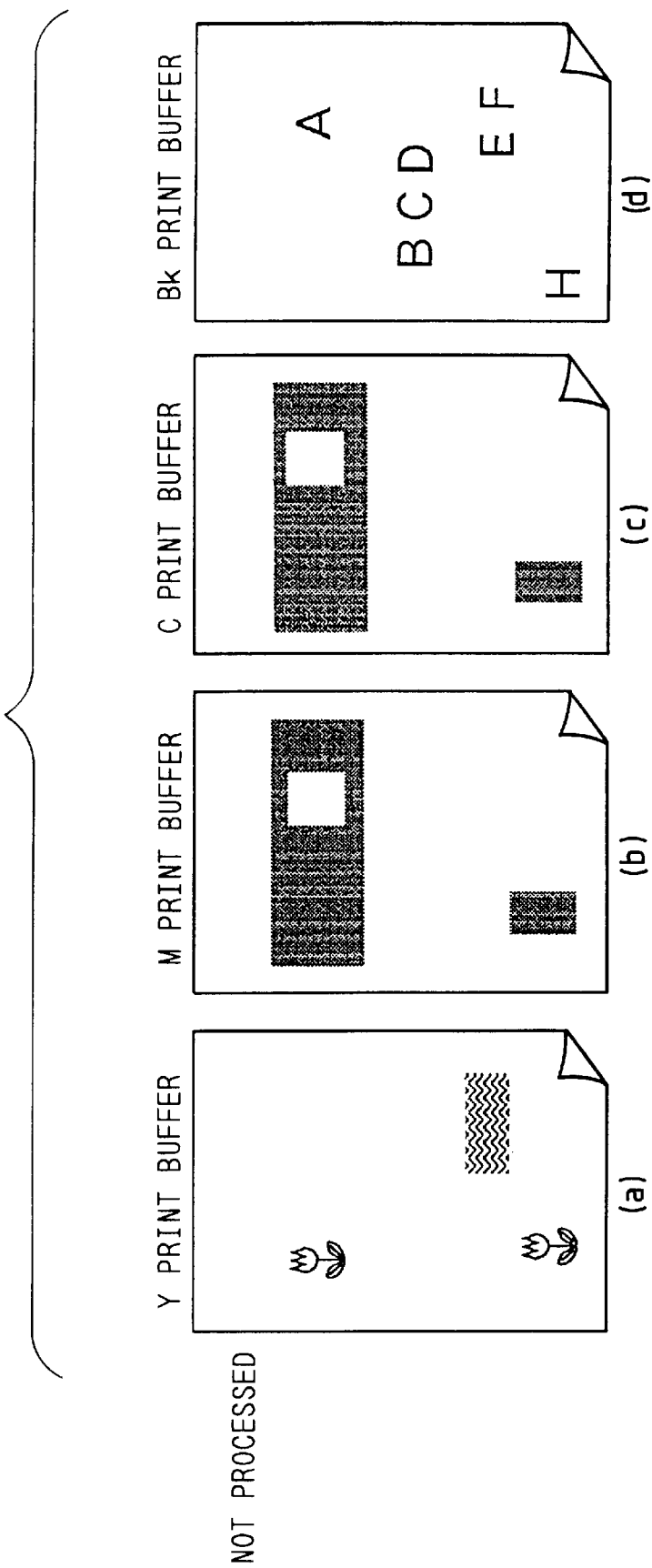

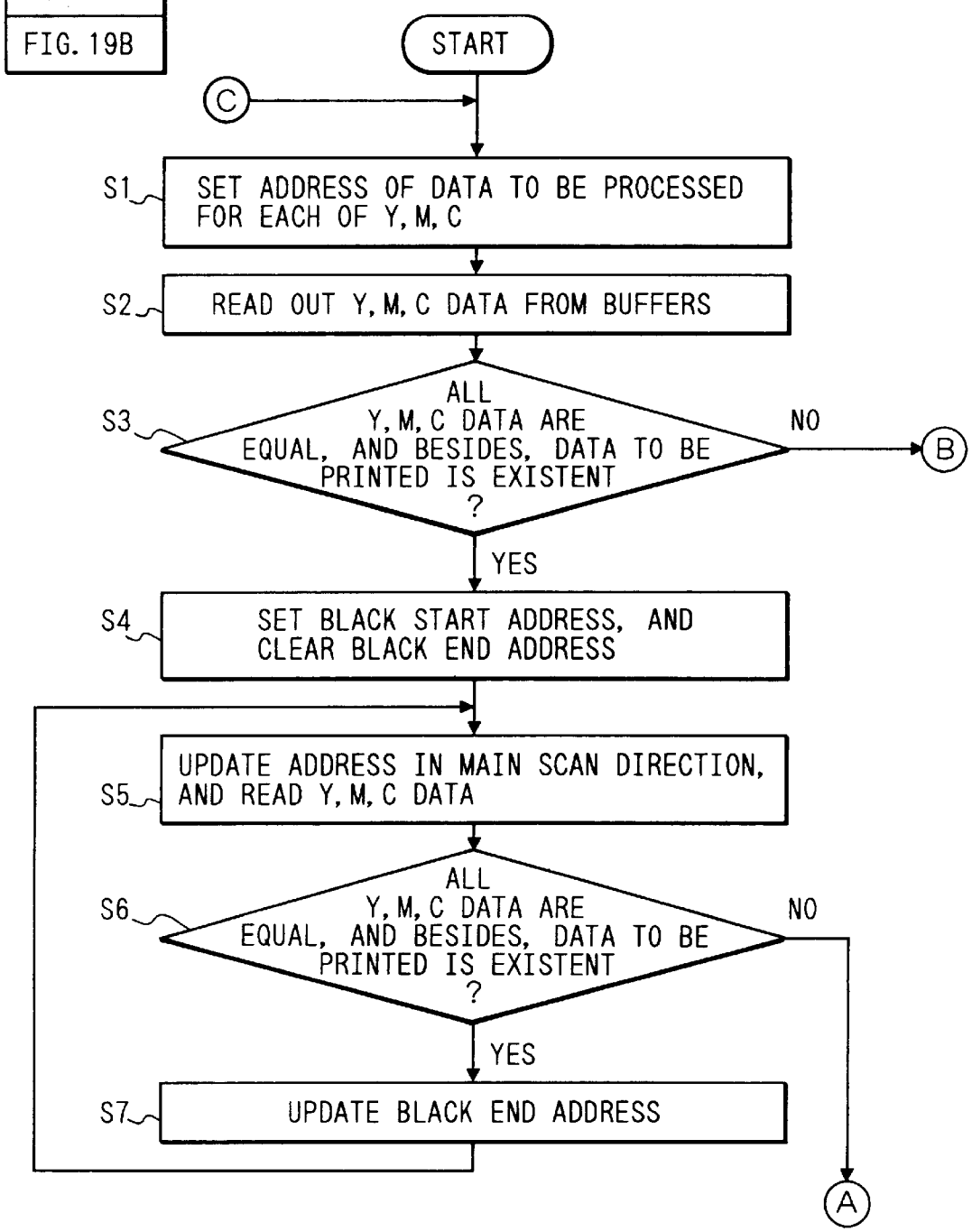

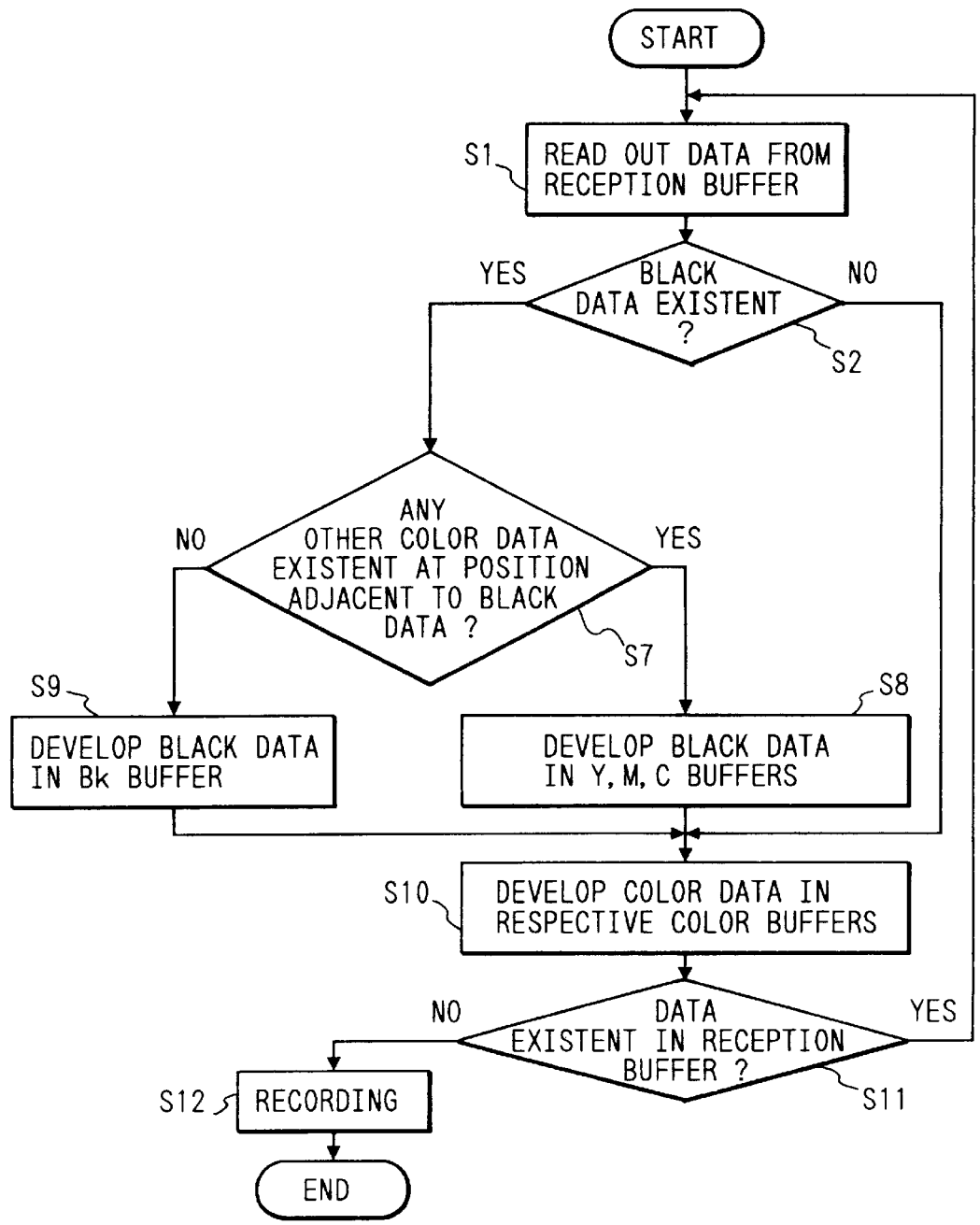

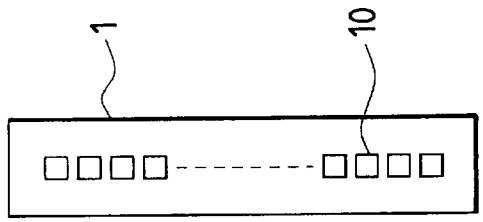
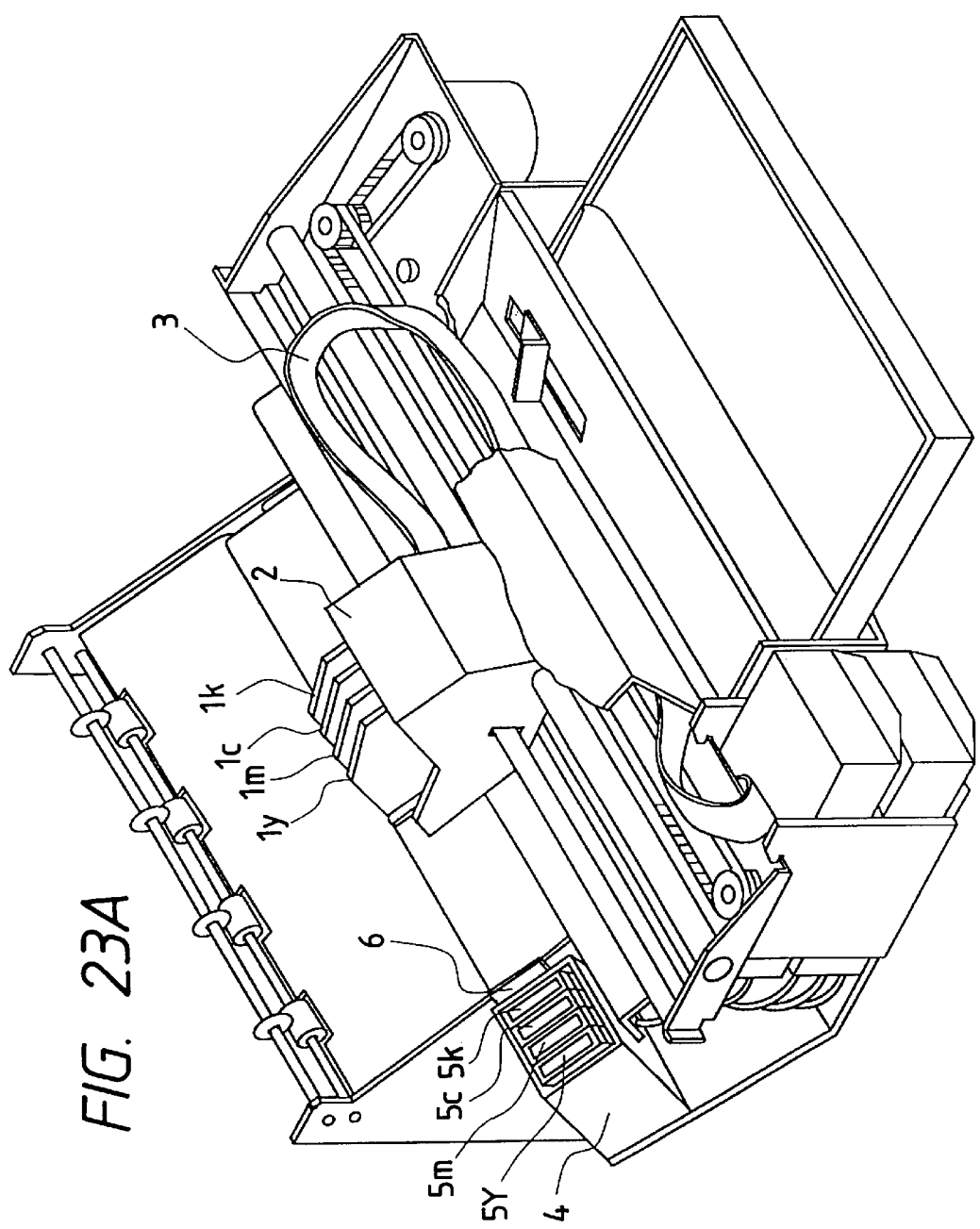

FIG. 24

| EMBODIED SAMPLES/ SAMPLES TO BE COMPARED | INK NO. | BLOTTING RATE | | | |
|---|---|---|---|---|---|
| | | YELLOW | MAGENTA | CYAN | BLACK |
| EMBODIED SAMPLE 11 | (1) | 2.3 | 2.3 | 2.3 | 1.7 |
| EMBODIED SAMPLE 12 | (2) | 3.3 | 3.3 | 3.3 | 1.7 |
| EMBODIED SAMPLE 13 | (3) | 2.8 | 2.8 | 2.8 | 1.8 |
| EMBODIED SAMPLE 14 | (4) | 3.0 | 3.0 | 3.0 | 1.8 |
| EMBODIED SAMPLE 15 | (5) | 3.4 | 3.4 | 3.4 | 2.2 |
| EMBODIED SAMPLE 16 | (6) | 2.0 | 2.0 | 2.0 | 1.9 |
| EMBODIED SAMPLE 17 | (7) | 2.6 | 2.6 | 2.6 | 1.8 |
| EMBODIED SAMPLE 18 | (8) | 2.5 | 2.5 | 2.5 | 2.2 |
| SAMPLE TO BE COMPARED 1 | (9) | 1.7 | 1.7 | 1.7 | 2.8 |
| SAMPLE TO BE COMPARED 2 | (10) | 1.6 | 1.6 | 1.6 | 2.6 |

FIG. 25

| EMBODIED SAMPLES/ SAMPLES TO BE COMPARED | INK NO. | FIXING TIME (SECOND) | | | |
|---|---|---|---|---|---|
| | | YELLOW | MAGENTA | CYAN | BLACK |
| EMBODIED SAMPLE 11 | (1) | 5 | 5 | 5 | 40 |
| EMBODIED SAMPLE 12 | (2) | 5 | 5 | 5 | 40 |
| EMBODIED SAMPLE 13 | (3) | 5 | 5 | 5 | 35 |
| EMBODIED SAMPLE 14 | (4) | 5 | 5 | 5 | 25 |
| EMBODIED SAMPLE 15 | (5) | 5 | 5 | 5 | 25 |
| EMBODIED SAMPLE 16 | (6) | 10 | 10 | 10 | 30 |
| EMBODIED SAMPLE 17 | (7) | 5 | 5 | 5 | 30 |
| EMBODIED SAMPLE 18 | (8) | 5 | 5 | 5 | 20 |
| SAMPLE TO BE COMPARED 1 | (9) | 30 | 30 | 30 | 5 |
| SAMPLE TO BE COMPARED 2 | (10) | 35 | 35 | 35 | 15 |

FIG. 26

| EMBODIED SAMPLES/ SAMPLES TO BE COMPARED | INK NO. | BLEEDING | | BLACK CHARACTER QUALITY |
|---|---|---|---|---|
| | | BLACK/ COLOR | COLOR/ COLOR | |
| EMBODIED SAMPLE 11 | (1) | ○ | ○ | ○ |
| EMBODIED SAMPLE 12 | (2) | ○ | ○ | ○ |
| EMBODIED SAMPLE 13 | (3) | ○ | ○ | ○ |
| EMBODIED SAMPLE 14 | (4) | ○ | ○ | ○ |
| EMBODIED SAMPLE 15 | (5) | ○ | ○ | △ |
| EMBODIED SAMPLE 16 | (6) | △ | △ | ○ |
| EMBODIED SAMPLE 17 | (7) | ○ | ○ | ○ |
| EMBODIED SAMPLE 18 | (8) | ○ | ○ | △ |
| SAMPLE TO BE COMPARED 1 | (9) | × | × | × |
| SAMPLE TO BE COMPARED 2 | (10) | × | × | × |

INK-JET RECORDING METHOD EMPLOYING INKS OF DIFFERENT CHARACTERISTICS AND APPARATUS THEREFOR

This application is a continuation of application Ser. No. 08/094,894 filed Jul. 22, 1993, now abandoned.

BACKGROUND OF THE INVENTION

1. Field of the Invention

The present invention relates to a color image forming method capable of recording a sharp color image with a high density and an apparatus therefor, or a color ink jet recording method, and more particularly to a color ink jet recording method utilizing color inks for example of yellow (Y), magenta (M) and cyan (C) or green (G), red (R) and blue (B) and black (Bk) ink.

The present invention is applicable to any equipment utilizing a recording medium such as paper, fabric, non-woven cloth or a overhead projector sheet, and the examples of such equipment include office equipment such as a printer, a copying machine or a facsimile apparatus, and industrial equipment utilized for mass production.

2. Related Background Art

The ink jet recording has been utilized in printers, copying machines, facsimile apparatus etc. because of the advantages of low noise, low running cost, ease of compactization and ease of color image formation.

In general, the ink jet recording achieves formation of a color image by the use of three color inks of cyan, magenta and yellow, or of four color inks additionally including black ink.

More specifically, in the conventional color ink jet recording apparatus, there are known a method which does not utilize black ink but forms black color by mixing yellow, magenta and cyan color inks or green, red and blue color inks in an area to be recorded black, and a method which applies black ink, prepared in advance, to the black recording area.

These conventional color recording methods are merely compared as to the preferability of the black color obtained by three color inks and that obtained by black ink, but the black ink and the three color inks are assumed to be of comparable properties.

For obtaining a color image of high development without ink blotting, the conventional ink jet recording methods have required an exclusive sheet provided with an ink absorbing layer. Recent improvements in ink have realized printing on so-called "plain paper" which is commonly utilized in the printers and copying machines. However, the print quality (or dignity) on such plain paper is still in an insufficient level. A major factor for such insufficiency lies in the balance between the mutual blotting of color inks and the black recording quality (particularly black character recording quality).

In forming a color image on plain paper by ink jet recording, there are generally employed rapid-drying inks having a high penetration speed into the plain paper. There is thus obtained a high-quality image without mutual blotting among the color inks, but such image is generally deficient in the overall density, and, around the recorded image area of each color, there is often observed so-called feathering phenomenon, or slight ink blotting along the paper fibers.

Such feathering is relatively non-apparent in the color image area, but becomes conspicuous in the black image area, leading to deterioration of the recording quality. Particularly when the black image is a black character, the character appears unsharp and unclear, regarded as of a poor quality.

Therefore, for obtaining a black recording of high quality with reduced feathering, there has to be used black ink with a relatively low penetration speed in the plain paper. In such case, however, at the boundary between a black recorded area and a recorded area of another color, there is generated blotting of the ink of said another color, thereby significantly deteriorating the print quality.

Also the conventional ink jet recording methods have been associated with the following drawback.

The ink employed in the conventional ink jet recording is principally composed of water, to which is added a water-soluble high-boiling solvent such as glycol, for the purposes of prevention of ink drying and of nozzle blocking. Recording on plain paper with such ink may give rise to an insufficient image density, due to the penetration of ink into the interior of the recording paper, or an uneven image density presumably due to an uneven distribution of the filler or the sizing material on the paper surface. Particularly in case of forming a color image, since plural color inks are superposed in succession prior to the image fixation, there are observed color blotting and uneven color mixing (hereinafter called bleeding) at the boundary of image areas of different colors, so that a satisfactory image cannot be obtained.

For resolving such drawbacks, the Japanese Patent Laid-open Application No. 55-65269 discloses the use of ink containing a compound enhancing the penetrating ability of the ink, such as a surfactant, and the Japanese Patent Laid-open Application No. 55-66976 discloses the use of ink principally composed of volatile solvent. However, although the former method can suppress the bleeding to a certain extent, the increased penetrating property of ink into the recording sheet causes the ink to penetrate with the colorant into the deep interior of the recording paper, thus resulting in a lowered image density or a deteriorated image sharpness. Also the enhanced wetting property to the paper surface ink spreading, thus leading to a lowered resolution or ink blotting, and the loss of print quality is undesirable particularly in the case of forming a black character. Also the latter method is associated, in addition to the above-mentioned drawbacks, with the nozzle blocking due to the solvent evaporation at the nozzles of the recording head.

As explained in the foregoing, the prevention of bleeding of the inks of black and other colors and the establishment of black print quality, or the prevention of blotting of the inks of black and other colors and the reduction of feathering particularly in the black ink are mutually incompatible requirements in improving the color recording quality. For meeting these requirements, there have been proposed following recording methods.

The Japanese Patent Laid-open Application No. 3-146355 proposes a method of not recording an area along the boundary between a black image area and a color image area. This method, however, is associated with a drawback that the data to be recorded are subjected to a variation.

Also the Japanese Patent Laid-open Application No. 4-158049 proposes a method of utilizing recording heads of plural colors for color recording and a recording head for character recording, which are switched according to the image to be recorded. This method, however, requiring the character recording head in addition to the conventional plural heads for color recording, is inevitably associated with an increase in the cost and in the dimension of the apparatus.

Also the Japanese Patent Laid-open Application No. 4-147866 proposes a recording method in which the fixing time for color inks is made shorter than that for black ink and shorter than a predetermined time. In this method, however, unfixed black ink flows into the area of a previously fixed color ink, thereby making worse the bleeding between the black color and other colors, so that a satisfactory image cannot be obtained.

SUMMARY OF THE INVENTION

In consideration of the foregoing, a principal object of the present invention is to provide a color image forming method with liquids, capable of securely providing a sharp color image of a high density, and a recording apparatus therefor.

Another object of the present invention is to provide a color ink jet recording method capable, in the case where a black image area is present at least independently from the color image area, of forming said black image area with a high density and with high quality without feathering, and also of providing a sharp image without ink blotting at the boundary between a color image area and a black image area, and a color ink jet recording apparatus therefor.

Still another object of the present invention is, in the case of recording an independent black image area not contacting a color image area, to form said black image area with a high density and with high quality with suppressed feathering, and, in other image areas, to achieve excellent recording quality without ink blotting between black and other colors, thereby attaining black recording of high quality and color recording of high quality in compatible manner.

Still another object of the present invention is, in the case of recording an independent black image area not contacting a color image area, to form said black image area with a high density and with high character quality, and, in other image areas, to obtain an excellent color image without bleeding between black and other colors, thereby attaining black recording of high quality and color recording of high quality in compatible manner, and also to enable compactization of the apparatus.

Still another object of the present invention is to provide a color image forming method that resolves the drawbacks in the conventional recording methods and enables effective utilization of a conventional recording method by discharging an ink droplet through film boiling induced by thermal energy or other record improving technologies, and a recording apparatus utilizing such color image forming method.

The above-mentioned objects can be attained, according to the present invention, by a color image forming method with liquids, employing black liquid with relatively superior diffusibility and color liquid, different in color from said black liquid, with relatively superior penetrability, in order to form a relatively sharp color image and to form a black image of a high density, providing a sufficiently high contrast.

According to the present invention, there is also provided a color ink jet recording method for forming a desired color image on a recording medium by means of black ink and color inks of plural colors different from said black ink, capable of discriminating whether a color image is present adjacent to a black image, and to determine whether said black image is to be formed with said black ink or with said plural color inks, according to the result of said discrimination.

Said method is characterized that said black image is formed with said black ink in the case where said black image is not adjacent to a color image, and that said black image is formed with said plural color inks in the case where at least a part of the periphery of said black image is adjacent to a color image.

Furthermore, according to the present invention, there is provided a color ink jet recording method for forming a desired color image on a recording medium by discharging black ink and color inks of plural colors different from said black ink, wherein the penetration speed of the black ink into the recording medium is slower than that of said plural color inks. Thus the black image is formed with a high density, and with limited blotting. Also the present invention is characterized by discriminating whether a color image area is present adjacent to a black image area, and determining whether said black image area is formed with said black ink or with said plural color inks, according to the result of said discrimination. In this manner the blotting can be reduced between the black image and the color image.

Furthermore, according to the present invention, there is provided a color ink jet recording method for forming a desired color image on a recording medium by discharging black ink and color inks of plural colors different from said black ink onto said recording medium, wherein the blotting rate of the black ink, represented by the following general formula (I):

$$A=B/C \tag{I}$$

wherein

A: blotting rate;

B: diameter ($\mu$m) of single dot formed on high quality paper;

C: diameter ($\mu$m) of a single ink droplet discharged, is smaller than the blotting rate of the color inks.

Also the present invention is characterized by discriminating whether a color image area is present adjacent to a black image area, and determining whether said black image area is formed with said black ink or with said plural color inks, according to the result of said discrimination.

BRIEF DESCRIPTION OF THE DRAWINGS

FIG. 4 is a view showing other examples of the alternately arranged pattern in the boundary area;

FIGS. 14A and 14B are views showing the contents of the buffer before and after the processing in the third embodiment;

FIGS. 15A and 15B are views showing the contents of the buffer before and after the processing in the fourth embodiment;

FIG. 21 is a flow chart showing the function of the embodiments;

FIG. 23A is a perspective view showing another ink jet recording apparatus in which the present invention is applicable;

FIG. 23B is a view of a recording head;

FIG. 24 is a table showing blotting rates of the embodiments;

FIG. 25 is a table showing fixing times of the embodiments; and

FIG. 26 is a table showing results of evaluation of the embodiments.

DETAILED DESCRIPTION OF THE PREFERRED EMBODIMENTS

Figure 1:
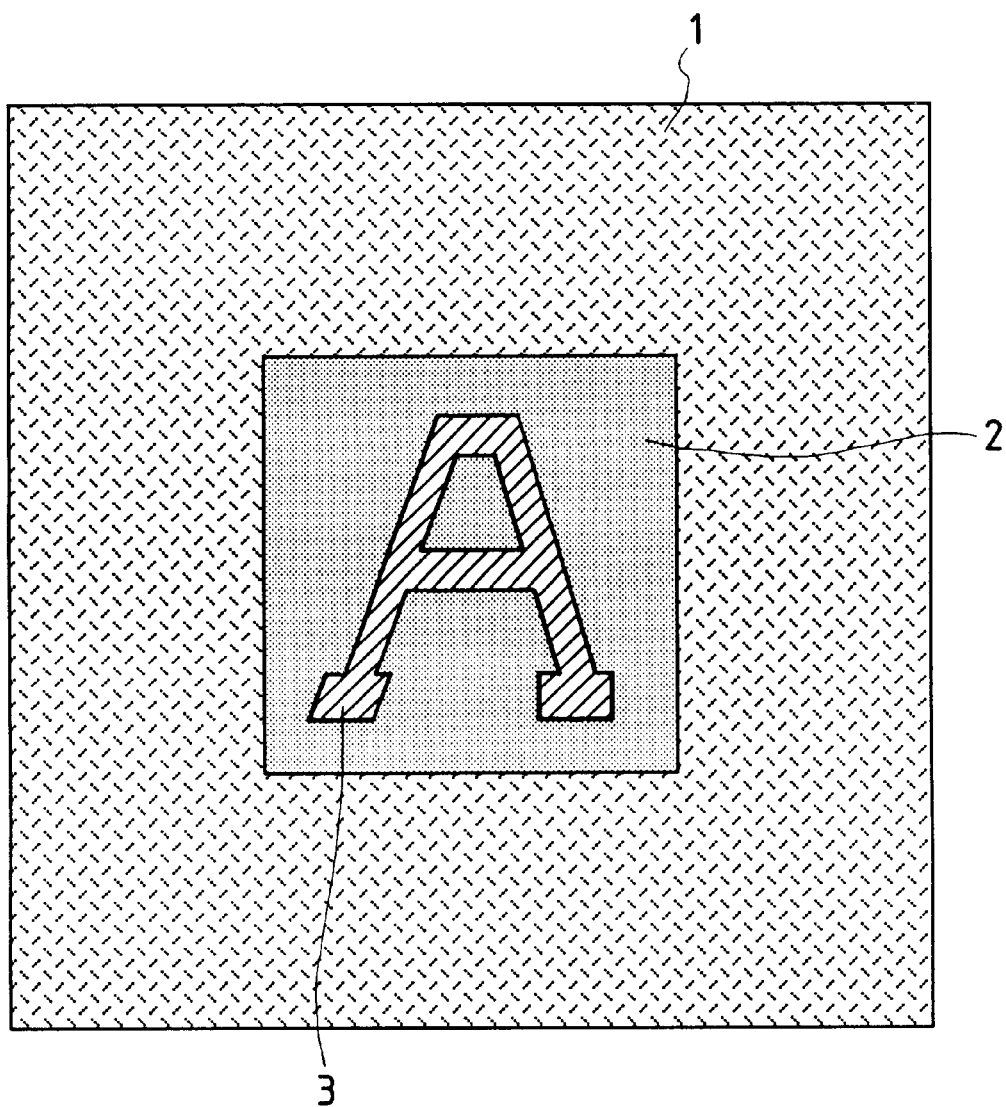
FIG. 1 is a schematic view for explaining the principle of the present invention.

Now the present invention will be clarified in greater detail by preferred embodiments thereof, with reference to the attached drawings.

At first there will be explained the outline of the embodiments.

The present invention is to provide a color image forming method with liquids, which is featured by the use of a black liquid of relatively superior diffusibility and color liquids of different colors from that of said black liquid, with relatively superior penetrability, in order to form a black image with a high density thereby achieving a high contrast, while maintaining a color image in a relatively sharp state.

The superior diffusibility means that the ink has a relatively low penetration speed, thereby staying on the paper surface, and diffuses uniformly without being too much affected by the surface irregularities of the paper, in order to attain a high density in the black image area on the recording paper, and to realize high image quality without feathering. On the other hand, the superior penetrability means that the ink has a relatively high penetration speed into the recording paper, in order to prevent blotting between different colors. As the density tends to become somewhat lower, it may be compensated for example by a corresponding increase in the dye concentration. The relative difference in these properties enables the use of the superior points of respective colors, thereby optimizing the entire color balance.

A similar effect as explained above can also be attained by the use of a black liquid of relatively superior surface active property (more specifically a larger surface tension) and color liquids different in color from said black liquid and with relatively inferior surface active property (more specifically a small surface tension). More specifically, it has been found that ACETYLENOL (acetylene glycol-EO adduct made by Kawaken Fine Chemical K.K.), which has not been considered in the prior art, is best for reducing the surface tension, and that color inks containing ACETYLENOL, or a fluorine-containing surfactant or another known surfactant in an amount from 0.5 to 15 wt. % (preferably from 1 to 3 wt. %) shows relatively lowered surface active property thereby showing increased penetrability and exhibiting satisfactory characteristics in colors other than black, and can provide an appropriate balance with a high density image formed with a black ink not containing such surfactant or containing it in a relatively smaller amount (preferably less than 1 wt. %). In physical terms, a preferred condition is that the surface tension of the ink, provided by the surface active property etc., is equal to or smaller than the critical surface tension of the paper.

In a more preferable condition, the recording with self-restraining effect of mutual diffusion can be attained, with improved image fixability, by the use, either singly or in combination, of a black liquid containing urea and showing relatively superior diffusibility and color liquids showing colors different from that of said black liquid, containing urea in an amount from 1 to 15 wt. % and also containing a surfactant such as ACETYLENOL in a relatively larger amount thereby showing superior penetrability.

On the other hand, it has become possible to compare the difference in the total characteristics of liquid, including the diffusibility or penetrability thereof, by defining the amount of light reflection on the liquid surface, and it has been found that a desired difference in the property of respective color images can be securely achieved by a difference in the above-mentioned characteristics of at least 100 msec, preferably at least 200 msec, and most preferably at least 500 msec. Said preferred difference corresponds to a difference of about 10 times in the penetration time, thereby enhancing the high density of the black image and the sharpness of the color image. Ideally there is-provided a color image forming method with liquids, which is featured by the use of a first color liquid of which penetration time, defined by the penetration time from the deposition on the recording medium to the abrupt change in the amount of surface reflected light is in the order of several tens to several hundred milliseconds (preferably 100 msec), and a second color liquid of a luminosity lower than that of said first color liquid and a penetration time in the order of a second.

Also the following embodiment resolves the penetration of solvent constituting the liquid at the image boundary area, or the unexpected dispersion of dye or pigment (for example blotting between different colors), resulting from the respective improvements in the characteristics of different colors. This is achieved by forming a barrier for preventing the dispersion, or by forming an error dispersion area, limiting the dispersion within a visual error area. Thus, there is provided a color image forming method with liquids, which is featured by the use of a black liquid with relatively superior surface active property, and plural color liquids different in color from said black liquid and having relatively inferior surface active property, wherein a black area positioned between said black liquid and said color liquids is formed by said plural color liquids. There is also provided a color image forming method, in which said black boundary area is formed by said plural color liquids, to which a small amount of black liquid is added within an extent not deteriorating the function of the dispersion preventing barrier, thereby improving the level of black color. In this manner it is rendered possible to prevent the image aberration in the boundary area, and to enhance the desired characteristics provided to respective liquids. The addition of the black liquid in said black boundary area is preferable, since it attains an increased density in the boundary area.

Such recording can be achieved, for example, by a color image recording apparatus comprising liquid jet recording means for discharging liquids of different colors onto a recording medium, and means for supplying said recording means with a recording signal, wherein said recording signal supplying means is adapted to supply said recording means with a signal for discharging only a black liquid of relatively superior diffusibility in a character area of black color only, or a signal for discharging a color liquid having a color different from that of said black liquid and also having relatively superior penetrability in an isolated color area of a color different from that of said black liquid, or a signal discharging at least plural color liquids of different colors in a black image area between the area of said black liquid and the area of said color liquid. Such apparatus can provide an image of a high density, while providing a character principally composed of black color.

More preferably, there are added the aforementioned conditions of relative surface active property. Besides there can be provided a practical color image forming method with improved image fixing ability, which is featured by the use of a black liquid containing urea and showing relatively superior diffusibility and color liquids, different in color from said black liquid, containing urea and ACETYLENOL and showing relatively superior penetrability. ACETYLENOL is contained in the color liquid in an amount of at least 0.5 wt. %, preferably at least 3 wt. %. Also preferred is the combination with the above-mentioned conditions.

In the foregoing embodiments, the boundary area is strictly defined, but, in the ink jet recording apparatus, there may occur ink discharge errors in local areas. It is also a preferred configuration to avoid influence on the image even in the presence of such error in the ink discharge. For this reason, there can be achieved practical and safe image formation, by forming, at least in a part of the boundary area of an image area to be formed with the black liquid only, an area with a color liquid different in color from said black liquid.

In a recording apparatus employing ink jet recording means provided with plural color ink discharging units arranged with a certain pitch along the scanning direction, in which the printing interval of the adjacent ink discharging units is in the order of 10 msec, it is also effective to provide a particularly practical configuration. Such configuration preferably satisfies the following conditions, in order to maintain the proper mixed state of plural color inks in the boundary area, until proper fixation of the images of respective colors. For this purpose there is provided a recording apparatus employing a first color liquid of which penetration time from the deposition onto the recording medium to the abrupt change in the amount of surface reflected light is in the order of several tens to several hundred milliseconds, preferably about 100 msec, and a second color liquid of a luminosity lower than that of said first color liquid and of said penetration time in the order of a second, for forming deposition areas, and comprising means for forming, in at least a part of the boundary of a deposition area to be formed with a black liquid, a deposition area with a color liquid only, different in color from said black liquid. The above-mentioned difference in the penetration time additionally enhance the effect of the present invention mentioned above.

The above-mentioned means for forming the boundary area is also effective in a recording apparatus employing ink jet recording means provided with plural color ink discharge units arranged at a certain pitch along a direction different from the scanning direction, in which the printing interval of the adjacent ink discharging units is in the order of a second, whereby the printing interval is made closer to the penetration time of the second color liquid in order to reduce the blotting of the first and second color liquids. Furthermore the present invention is effective in a recording apparatus in which the printing interval is sufficiently larger than the penetration time of the second color liquid of the slower penetration, since the blotting in the boundary area may take place if the ink drying is insufficient.

Embodiment 1

Figure 2:
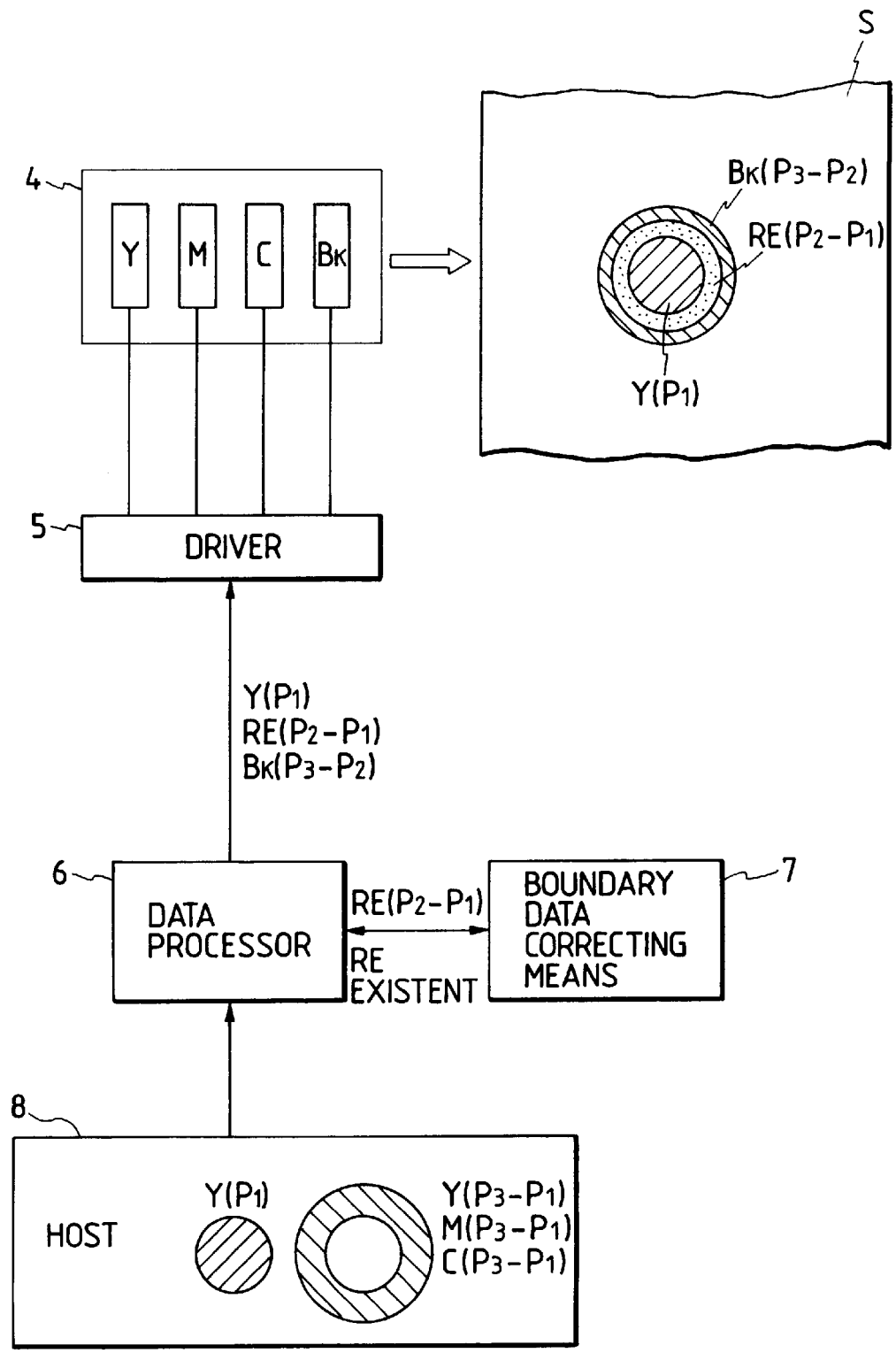
FIG. 2 is a schematic view for explaining the principle of correction of a boundary area in the present invention.

FIG. 2 illustrates an embodiment of the present invention, applied to a serial ink jet recording apparatus. A carriage (not shown) supports a color recording head 4 of four colors of cyan (C), magenta (M), yellow (Y) and black (Bk), and is movably supported by a known guide shaft. The carriage is moved, by a driving motor such as a stepping motor driven by a motor driver, along the recording surface of a recording sheet S, such as paper. A transport roller for advancing the recording sheet S, guide rollers for guiding said sheet S, a sheet transport motor etc. are also provided though they are not illustrated.

The recording heads 4 are respectively provided with liquid paths for discharging ink droplets toward the recording sheet S, ink tanks respectively corresponding to the recording heads 4Y, 4M, 4C, 4Bk, and discharge energy generating means (preferably electrothermal converters for inducing film boiling by thermal energy) provided in said liquid paths etc. and are selectively given ink discharge signals through the head drivers 5.

Table 1 shows the specific compositions of inks, constituting a feature of the present embodiment.

TABLE 1

| Bk ink | |
|---|---|
| Water | 82 wt. % |
| Black dye | 3 wt. % |
| Glycerine | 5 wt. % |
| Urea | 5 wt. % |
| Thioglycol | 5 wt. % |
| C ink | |
| Water | 77 wt. % |
| Cyan dye | 3 wt. % |
| Glycerine | 5 wt. % |
| Urea | 5 wt. % |
| Thioglycol | 5 wt. % |
| ACETYLENOL | 5 wt. % |
| M ink | |
| Water | 77 wt. % |
| Magenta dye | 3 wt. % |
| Glycerine | 5 wt. % |
| Urea | 5 wt. % |
| Thioglycol | 5 wt. % |
| ACETYLENOL | 5 wt. % |
| Y ink | |
| Water | 78 wt. % |
| Yellow dye | 2 wt. % |

TABLE 1-continued

| | |
|---|---|
| Glycerine | 5 wt. % |
| Urea | 5 wt. % |
| Thioglycol | 5 wt. % |
| ACETYLENOL | 5 wt. % |

The Bk ink achieves satisfactory diffusibility on the recording sheet, and does not show feathering. On the other hand, other color inks contain ACETYLENOL as surfactant in an amount of 5 wt. % for achieving superior penetrability and preventing blotting between different colors. The penetration time into the recording paper is not simply determined by the surface tension of the ink, but is considerably influenced thereby. Referring to Table 1, the surface tension is 50 dyne/cm$^2$ for the Bk ink and 28 dyne/cm$^2$ for color inks. In this manner the surface tension is designedto be considerably higher in the Bk ink than in the color inks. In the present embodiment, for an ink droplet of 80 ng/drop, the penetration time measured by the aforementioned amount of surface reflected light is about 5 sec. for the Bk ink and about 80 msec., though these values are dependent on the recording paper to be used.

In the following there will be explained the correction of the boundary area, which is one of the features of the present embodiment.

Data processor 6 including a CPU is provided with means 7 for correcting the boundary data as explained before, and said means automatically modifies the data of the boundary area RE for driving a driver 5, according to the input information from a host equipment 8.

The detection of the boundary area in the present embodiment is conducted by the data processing in the recording apparatus, but the data processing including the data correction of the boundary area RE may be conducted by a software for controlling the recording apparatus, in the host equipment 8 and the recording apparatus may receive thus processed data. Also the data transferred from the host equipment 8 can be in the form of Y, M, C and Bk data or R, G and B data instead of Y, M and C data.

The data processing for correcting the boundary area RE consists of at first discriminating whether a color image is present adjacent to a black image, and determining whether to form the black image with the black ink alone or to form the boundary area with plural color inks, according to the result of said discrimination. In the present embodiment, in which the boundary data correction is conducted in the main body of the recording apparatus, the data transferred from the host equipment are stored in a buffer, then the black data are compared with other color data to detect the boundary.

FIG. 1 is a schematic view showing the principle of the present embodiment.

In FIG. 1 there are shown a 100% solid yellow area 1, a 100% solid black area 2, and a white paper area 3. Thus a white character "A" of which contour is black is printed on a yellow background.

The CPU 6 of the recording apparatus checks the black data on the buffer, from the upper left corner of the image. The black data are detected for the first time when the checking procedure proceeds to the area 2. At a point where the presence of black data is detected, there is discriminated whether an adjacent color image is present. In this example the yellow data of the area 1 is detected, so that a boundary with another color is identified, and the boundary data correction is identified necessary.

On the other hand, when the check procedure proceeds to the white character "A", there is again detected the boundary of the black image, but the boundary data correction is identified unnecessary, since an adjacent another color image is not detected at this point. Thus, in this example, the boundary data correction is conducted on the external four sides of the area 2, but the boundary of the area 2 with the white character is recorded with the black ink only, without the boundary data correction. If the external four sides of the area 2, adjacent to the yellow image area 1, are recorded with the black ink only without the boundary data correction, the boundary becomes very unclear because of the blotting when the plain paper is used as the recording medium, whereby the image quality is significantly deteriorated.

In the following there will be explained the sequence of correction of the image data, with reference to FIG. 2. Data corresponding to a black image of an area P3–P1 and data corresponding to a yellow image of an area P1 are transferred from the host equipment 8 to the data processing unit of the recording apparatus. In this example, the data of the black image are transferred in the form of superposed data of three colors Y, M, C, and the data processing unit 6 replaces the three-color superposed portion with Bk data and stores said data in the buffer, in addition to the transferred Y, M and C data.

Then the Bk data are checked as explained above to detect the black data boundary RE. Upon completion of the check for the Bk data on the buffer, the boundary data correction means 7 effects the boundary data correction. In this embodiment, the boundary data correction deletes a corrected portion RE (P2–P1) of a predetermined boundary width from the black data, and said portion RE is added, according to a predetermined process color pattern (PCP) to the Y, M, C data in the buffer.

As a result, the actual recording signals given from the driver 5 to the recording heads 4 consist of a yellow area P1, an area (P2–P1) recorded with plural colors according to said PCP, and a black area (P3–P2). On the recording paper S, there are recorded, in concentric circles, a yellow area, a corrected black color area recorded with plural colors, and an external black area.

Figure 3:
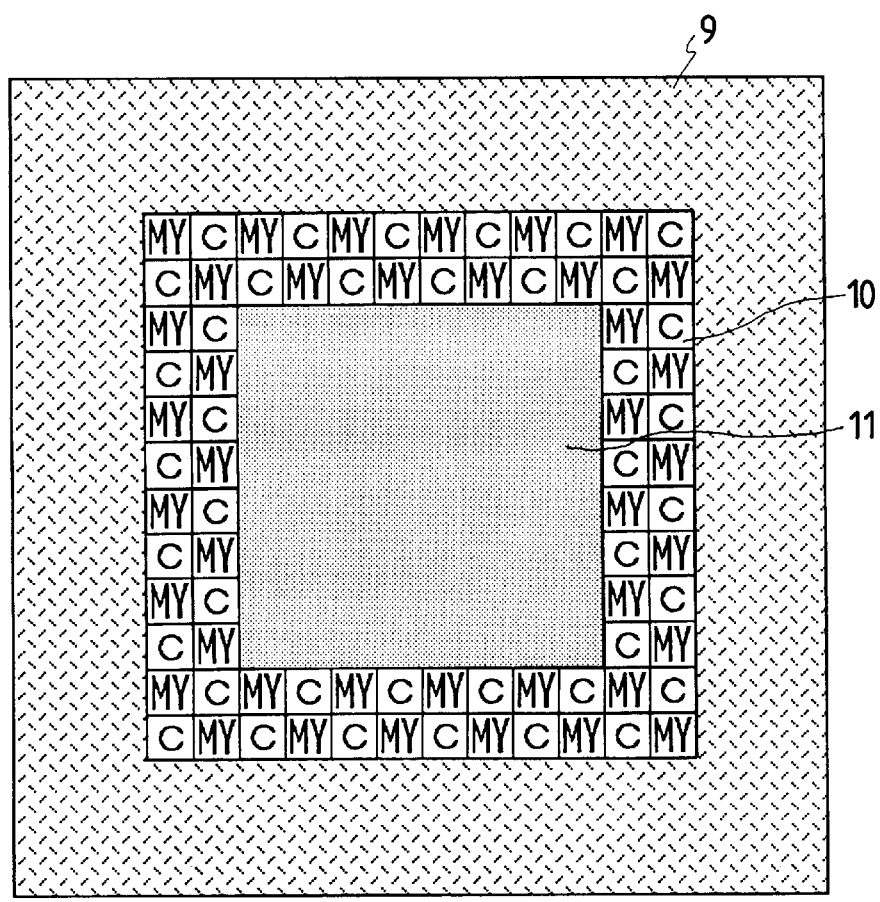
FIG. 3 is a schematic view of a boundary area in which a cyan (C) pixel and a magenta (M) and yellow (Y) superposed pixel are alternately arranged.

FIG. 3 is a schematic view in which the boundary area of a width of two pixels is formed by a process color pattern (PCP) consisting of an alternate arrangement of a cyan pixel and a magenta/yellow superposed pixel. For the ease of representation, the shape of the image area is represented by squares, instead of circles.

In FIG. 3 there are shown a 100% solid yellow area 9, a corrected black area 10 after the boundary data correction, and a black image area 11 recorded by the black ink only. The original black image corresponds to the areas 10 and 11. In this example of boundary data correction, the boundary area of a width of two pixels is recorded with plural colors according to said process color pattern. In this example, ink blotting occurs at the boundary between the area 10 recorded with the Bk ink of superior diffusibility and the area 11 recorded with the C, M and Y inks superior in the penetrability, but such blotting does not cause any problem on the image, since these areas are to be recorded with a same color.

On the other hand, at the boundary between the area 10 recorded with plural inks of superior penetrability and the area 9 recorded with the yellow ink with superior penetrability, there is not induced blotting of an extent deteriorating the image quality even between colors, because both image areas are recorded with inks of superior penetrability. Thus there is obtained an image of high quality, with a high black density in the area 11 and without blotting at the boundary of different colors in the areas 9, 10.

Figure 5:
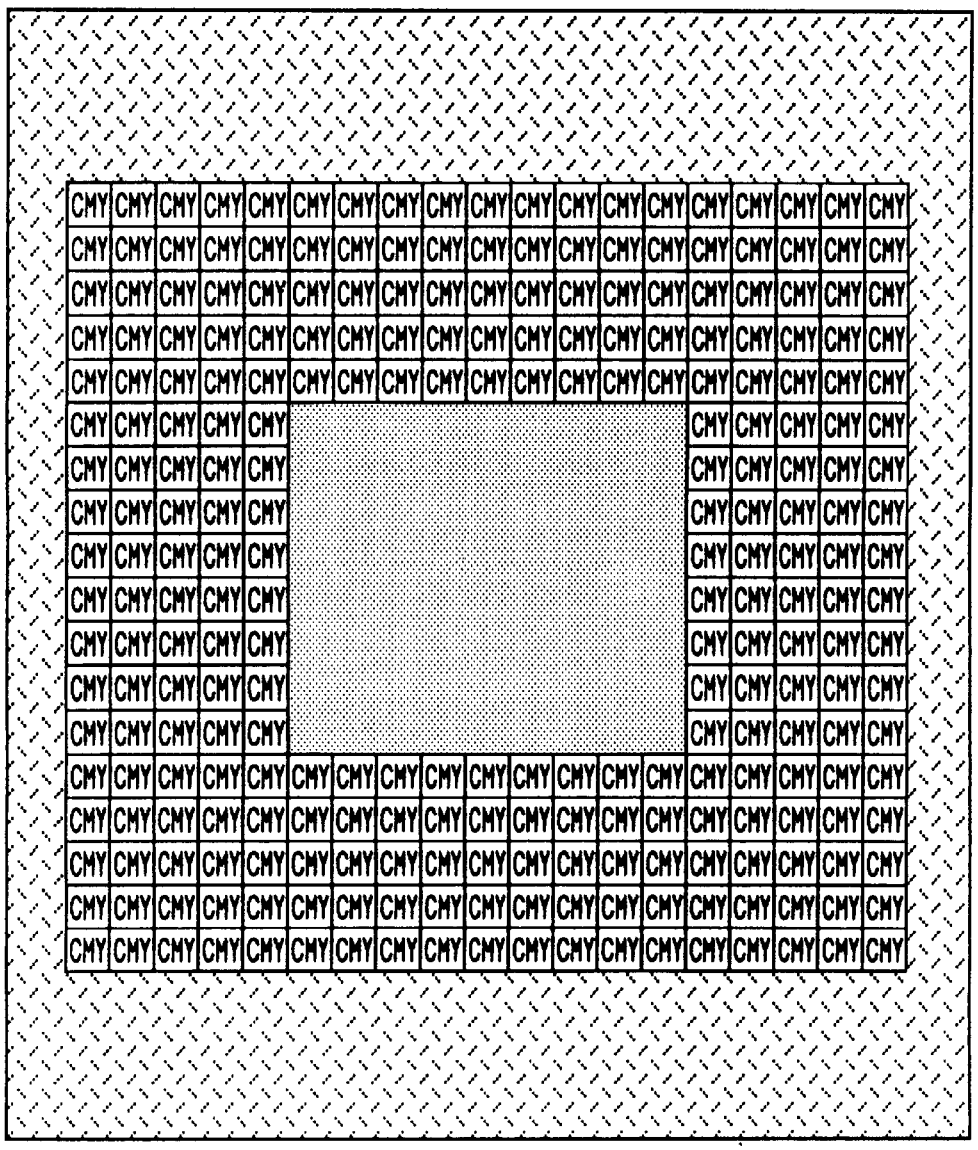
FIG. 5 is a schematic view in which a boundary area of five pixels are represented by a C, M, Y superposed pattern.

FIG. 4 shows other examples (#1–#8) of the alternately arranged pattern (process color pattern) in the boundary area. The above-explained example of boundary data correction corresponds to the pattern #7 shown in FIG. 4, in which the C pixel and M–Y pixel are alternately arranged in the boundary area of a width of two pixels. Also FIG. 5 shows an example in which the boundary area of a width of five pixels is represented by C, M, Y superposed pixels, corresponding to the example #1 in FIG. 4. The alternately arranged pattern in FIG. 4 and/or the width of the boundary area may be selected by the user according to the kind of the recording medium, the preference of the user for the level of black color, the image data, the recording speed or the recording mode such as a black enhancing mode, or they may be automatically selected. Also they may be selected for each model of the recording apparatus, according to the recording density, the kind of ink and the discharge amount thereof.

Referring to FIG. 4, the pattern #1 provides a high density but should be used in a recording medium with a relatively high ink absorbing capacity, because it deposits a large amount of ink. The patterns #2 to #5 may be suitably selected according to the difference in color development depending on the recording medium, and also according to the taste of the user. The patterns #6 and #7 are designed to reduce the ink deposition amount, and are suitable for a recording medium of a relatively low ink absorbing capacity, a high recording density, or a recording mode or image data in which a somewhat low density is not conspicuous. Then, in contrast to the patterns #1–#7 in which the boundary area is recorded with the C, M and Y inks of superior penetrability only, the pattern #8 utilizes the Bk ink of inferior penetrability in addition to the C, M, Y inks of superior penetrability, thus easily causing blotting but providing a corrected black color close to the real black color. This pattern can therefore be selected according to the absorbing property of the recording paper, in consideration of the balance of blotting with the black ink.

Also at the boundary between the C, M, Y inks of increased penetrability and the Bk ink of superior diffusibility, there may result, in addition to the blotting of the image, a blotting of the penetrability enhancing agent, thus forming a whitish portion in the black image area. Such formation of whitish portion can be suppressed by adding the Bk ink, not containing such penetrability enhancing agent, in the boundary area as in the pattern #8, in order to reduce the unevenness in the distribution of concentration of said penetrability enhancing agent.

Also since said pattern provides a corrected black color close to the real black color, there may be selected, depending on the kind of the recording paper, a recording mode in which all the black data are recorded with such corrected black color, for the purpose of simplifying the data processing and increasing the recording speed.

The example shown in FIG. 5, having an increased width of the boundary area to be recorded with said process color pattern, enables the use of a black ink with a high concentration and with reduced feathering phenomenon. However, if the pixel density is low, the boundary area recorded with the corrected black color which is somewhat different from the real black color becomes wider and may become noticeable. Consequently the width of such boundary area should be determined in consideration of the blotting and the color of such corrected black color. Also said width may be determined in consideration of the errors in the ink discharge, as explained before. Furthermore, the amount of ink discharge may be varied for each color, according to the selection of the processed color pattern, for correcting the color difference or regulating the ink deposition amount.

Table 2 shows the compositions of another preferred example of the inks, in which the black ink is given somewhat higher penetrability for suppressing the blotting, in comparison with those shown in Table 1.

TABLE 2

| Bk ink | |
| --- | --- |
| Water | 82.9 wt. % |
| Black dye | 3.5 wt. % |
| Triethylene glycol | 5.0 wt. % |
| Hexanetriol | 7.0 wt. % |
| Isopropyl alcohol | 1.5 wt. % |
| ACETYLENOL | 0.1 wt. % |
| C ink | |
| Water | 83.0 wt. % |
| Cyan dye | 2.5 wt. % |
| Triethylene glycol | 5.0 wt. % |
| Hexanetriol | 7.0 wt. % |
| Isopropyl alcohol | 1.5 wt. % |
| ACETYLENOL | 1.0 wt. % |
| M ink | |
| Water | 83.0 wt. % |
| Magenta dye | 2.5 wt. % |
| Triethylene glycol | 5.0 wt. % |
| Hexanetriol | 7.0 wt. % |
| Isopropyl alcohol | 1.5 wt. % |
| ACETYLENOL | 1.0 wt. % |
| Y ink | |
| Water | 82.5 wt. % |
| Yellow dye | 1.5 wt. % |
| Triethylene glycol | 5.0 wt. % |
| Hexanetriol | 7.0 wt. % |
| Isopropyl alcohol | 2.5 wt. % |
| ACETYLENOL | 1.5 wt. % |

Also Table 3 shows the compositions of another preferred example of the inks, in which C, M and Y inks contain cyclohexanol as penetrability improvement agent which does not deteriorate the discharge properties such as fixing property, instead of ACETYLENOL as penetrability enhancing agent in the foregoing example.

TABLE 3

| Bk ink | |
| --- | --- |
| Water | 71.0 wt. % |
| Black dye | 4.0 wt. % |
| Diethylene glycol | 20.0 wt. % |
| Urea | 5.0 wt. % |
| Cyclohexanol | 0.0 wt. % |
| C ink | |
| Water | 68.5 wt. % |
| Cyan dye | 3.5 wt. % |
| Diethylene glycol | 20.0 wt. % |
| Urea | 5.0 wt. % |
| Cyclohexanol | 3.0 wt. % |
| M ink | |
| Water | 68.5 wt. % |
| Magenta dye | 3.5 wt. % |
| Diethylene glycol | 20.0 wt. % |
| Urea | 5.0 wt. % |
| Cyclohexanol | 3.0 wt. % |
| Y ink | |
| Water | 69.5 wt. % |
| Yellow dye | 2.5 wt. % |
| Diethylene glycol | 20.0 wt. % |

TABLE 3-continued

| | |
|---|---|
| Urea | 5.0 wt. % |
| Cyclohexanol | 3.0 wt. % |

Also in the above-mentioned two examples of inks, the Bk ink achieves satisfactory diffusibility on the recording paper, without feathering, thereby enabling recording of high quality with a high density. On the other hand, other color inks contain ACETYLENOL or cyclohexanol as the penetrability providing agent, for achieving excellent penetrability and preventing ink blotting between different colors. The surface tension of the above-mentioned inks is 35 dyne/cm$^2$ or higher for the Bk ink, and 32 dyne/cm$^2$ or lower for other color inks. Thus the surface tension is selected higher in the Bk ink than in the color inks, also in consideration of the viscosity. Also in either example, for an ink droplet of 80 ng/drop, desired image characteristics can be attained by regulating the penetration time, measured in the aforementioned manner by the amount of surface reflected light, at least 10 times larger for the Bk ink than for other color inks, though said penetration time may vary depending on the recording paper.

Following cases were investigated as reference examples. When the Bk ink contained the penetration enhancing agent in a comparable amount as in other color inks, the blotting was suppressed but the character quality was significantly deteriorated in certain cases. On the other hand, a reduction of the amount of the penetration enhancing agent in other color inks increased the image density, but the ink blotting at the boundary became severer even when the present invention was applied. The excellent effect of the present invention can also be confirmed from these reference examples.

The present embodiment can form the desired image in a more appropriate state, positively utilizing the difference in the characteristics of the liquids, in a manner unexpected in the prior art. Also the correction of the boundary area provides an advantage of forming an excellent image even when the difference in the characteristics of the liquids is more enhanced, and is at least: capable of an image significantly superior to the image obtained in the prior art.

Embodiment 2

At first there will be explained the outline of a second embodiment.

Figure 20A:
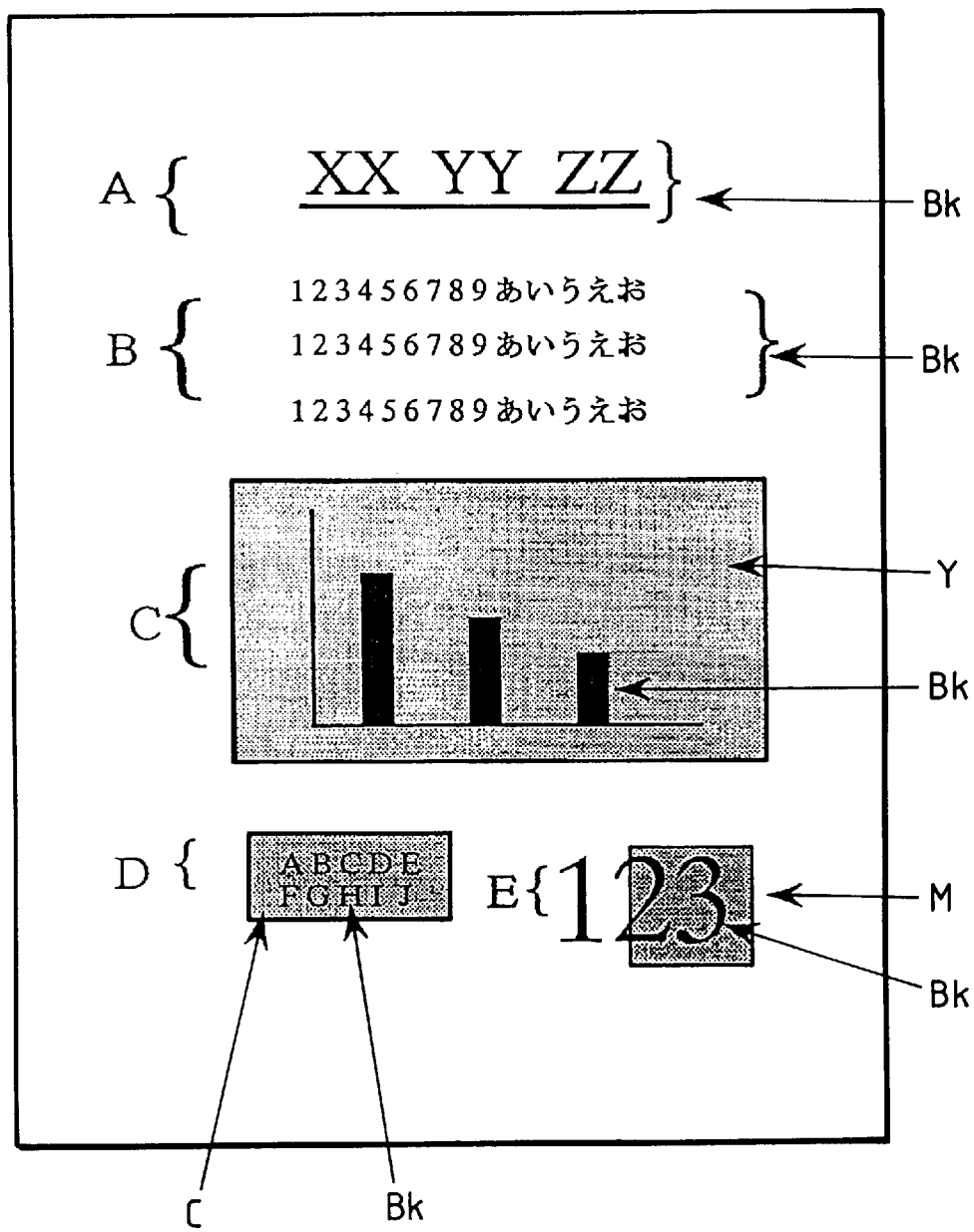
FIGS. 20A to 20C are views showing an example of the image for explaining the present invention.

FIG. 20A illustrates an image containing black images and color images in mixed manner. An image portion A consists of black characters X, Y and Z and an underline, and is represented by bit image data. An image portion B consists of code data for black characters. An image portion C consists of black graphic patterns on a yellow background, and is represented by bit image data. An image portion D consists of black character code data on a cyan background. An image portion E consists of black image data, with a partial magenta background image.

The image portion A, consisting of bit image data, is stored in the buffers for the yellow, magenta and cyan color inks. However, as the data of the buffers for the different colors are mutually equal, the image portion A is printed by the black ink recording head. In this operation, the data stored in the color ink buffers are transferred into the black ink buffer, in which the recording signal to be supplied to the black ink recording head is stored.

The image portion B, consisting of the black character code data, is printed by the black ink recording head. The image portion C contains black graphic patterns on a yellow background image. Since the black images are completely surrounded by the yellow image, the black patterns are printed with the color inks, namely the yellow, magenta and cyan inks. Since this image consists of bit image data, the data of the black graphic patterns are stored in the buffers for the yellow, magenta and cyan inks. As the data stored in said buffers are mutually different because of the presence of the background yellow image, the black graphic patterns are formed with the yellow, magenta and cyan inks, utilizing the data stored in the buffers of the respective colors.

In the image portion D, since the black character code data have a cyan background image, the black characters are printed with the color inks as in the image portion C. Said black characters, consisting of the character code data, are stored in the buffer for the black ink, but, because the yellow data are present in the same pixels as those in the print positions of the character code data and also in the adjacent pixels, the black characters are printed with the color inks.

In the image portion E, the magenta image is present in a part of the background of the black bit image data. Among those data, the numeral "1" is printed with the black ink recording head, as it does not have an adjacent color image. On the other hand, a numeral "3" is printed with the color ink recording heads, as it is completely surrounded by the magenta image. The numeral "2" is adjacent, in a part of the periphery thereof, to the magenta image. In this case, said numeral "2" may be printed with the black ink recording head or with the color ink recording heads, according to the characteristics of the inks to be employed, and also to the extent of the periphery thereof, adjacent to the color image.

Figure 20B:
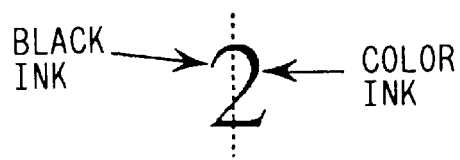
Figure 20C:
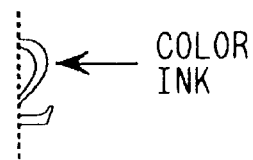

Also in this case, it is also possible to print a part of the black image with the black ink recording head and to print the remainder with the color ink recording heads. More specifically, as shown in FIG. 20B, the left-hand portion and the right-hand portion of the broken line may be respectively printed with the black ink recording head and with the color ink recording heads. Otherwise, as shown in FIG. 20C, the boundary portion alone, adjacent to the color image, of the black image may be printed with the color recording heads while the remaining portion may be printed with the black ink recording head.

In the following there will be a more detailed explanation will be given on the present embodiment.

Figure 6:
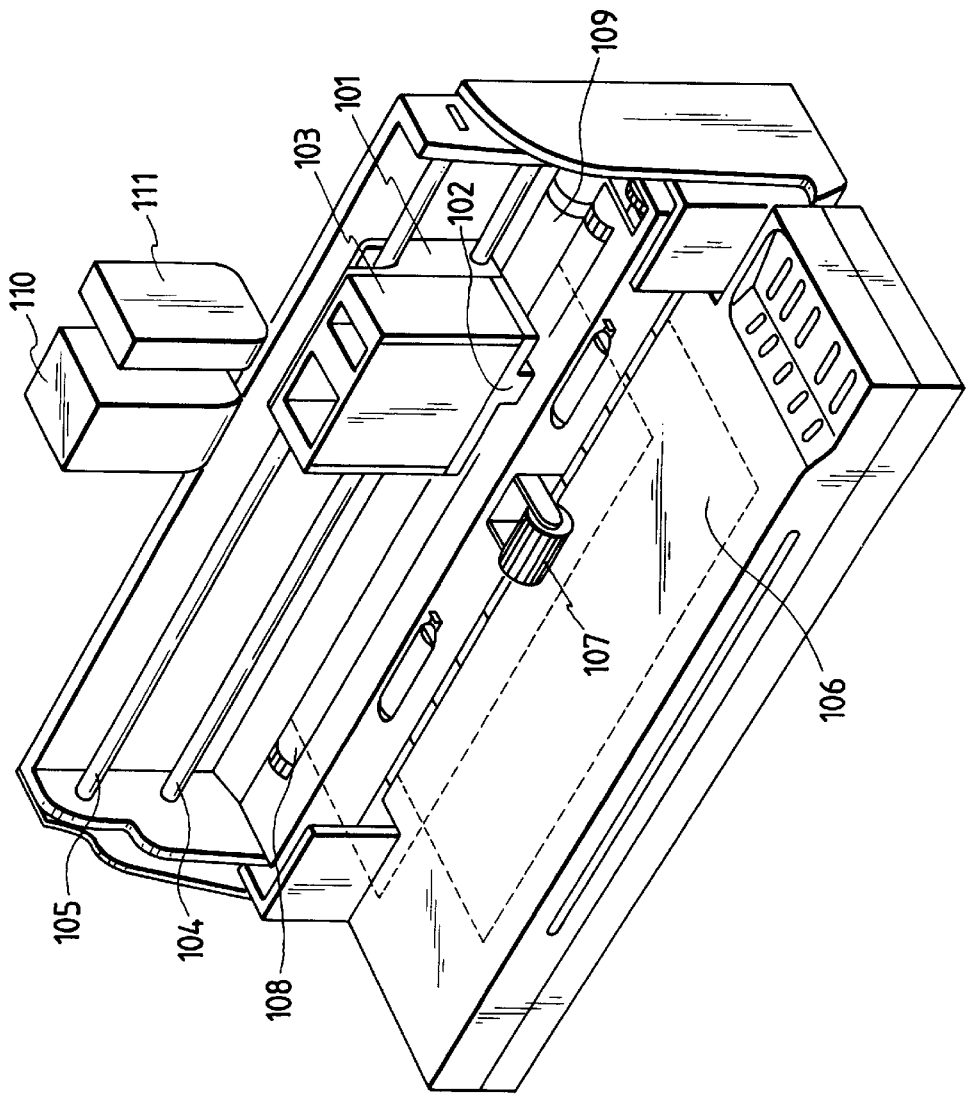
FIG. 6 is a perspective view of an ink jet recording apparatus in which the present invention is applicable.

FIG. 6 is a perspective view of an ink jet recording apparatus equipped with a carriage and ink cartridges of the present embodiment. A carriage 101 supports a printing head 102 and a cartridge guide 103, and can effect a scanning motion along guide shafts 104, 105.

A recording paper 106 is fed by a feed roller 107 into the apparatus, pinched by a feed roller 108, a pinch roller (not shown) and a pressure plate 109, and is advanced onto a roller 102 for printing. There are provided a color ink cartridge 110 including yellow, magenta and cyan color inks, and a black ink cartridge 111, which are separately inserted into the cartridge guide 103, thereby communicating with the printing head 102.

The yellow, magenta and cyan inks contained in the color ink cartridge 110 have a high penetration speed into the recording paper, in order to prevent ink blotting at the boundary of different colors in the color image formation. On the other hand, the black ink contained in the black ink cartridge 111 has a lower penetration speed into the recording paper, in comparison with that of said three color inks, in order to obtain a high-quality black image of a high density, with reduced ink blotting.

As shown in FIGS. 7A and 7B, the recording head 102 is provided, on the front face thereof, with groups of ink discharge openings for the yellow, magenta, cyan and black inks, arranged linearly. Each group contains 24 openings for the yellow, magenta or cyan color, and 64 openings for the black color, and said groups are separated by gaps larger than the pitch of said ink discharge openings.

Said discharge openings respectively communicate with ink liquid paths, behind which provided is a common chamber for supplying said liquid paths with ink. In the liquid paths, respectively corresponding to the discharge openings, there are provided electrothermal converters for generating thermal energy utilized for ink droplet discharge and wirings for supplying said converters with electric power. Said electrothermal converters and wirings are formed by a film forming technology, on a substrate 201 for example of silicon. Said discharge openings, liquid paths and common liquid chamber are formed by laminating partitions of glass or resin and a ceiling board on said substrate. Behind these components, a driving circuit for driving said electrothermal converters according to the recording signals is provided in the form of a printed circuit board.

The silicon substrate 201 and the printed circuit board 202 are mounted on an aluminum plate 203. Pipes 204–207, protruding parallel to said aluminum plate 203 from a plastic member 208, called distributor and spreading perpendicularly to said silicon substrate, communicate with flow paths formed in said distributor, and said flow paths communicate with the common liquid chambers.

In said distributor there are provided four flow paths respectively for the yellow, magenta, cyan and black inks, which are respectively connected to the common liquid chambers.

Each of the discharge openings for the yellow, magenta and cyan inks provided in the printing head 102 discharges ink of about 40 ng, while each of the discharge openings for the black ink discharges ink of about 80 ng.

Figure 8:
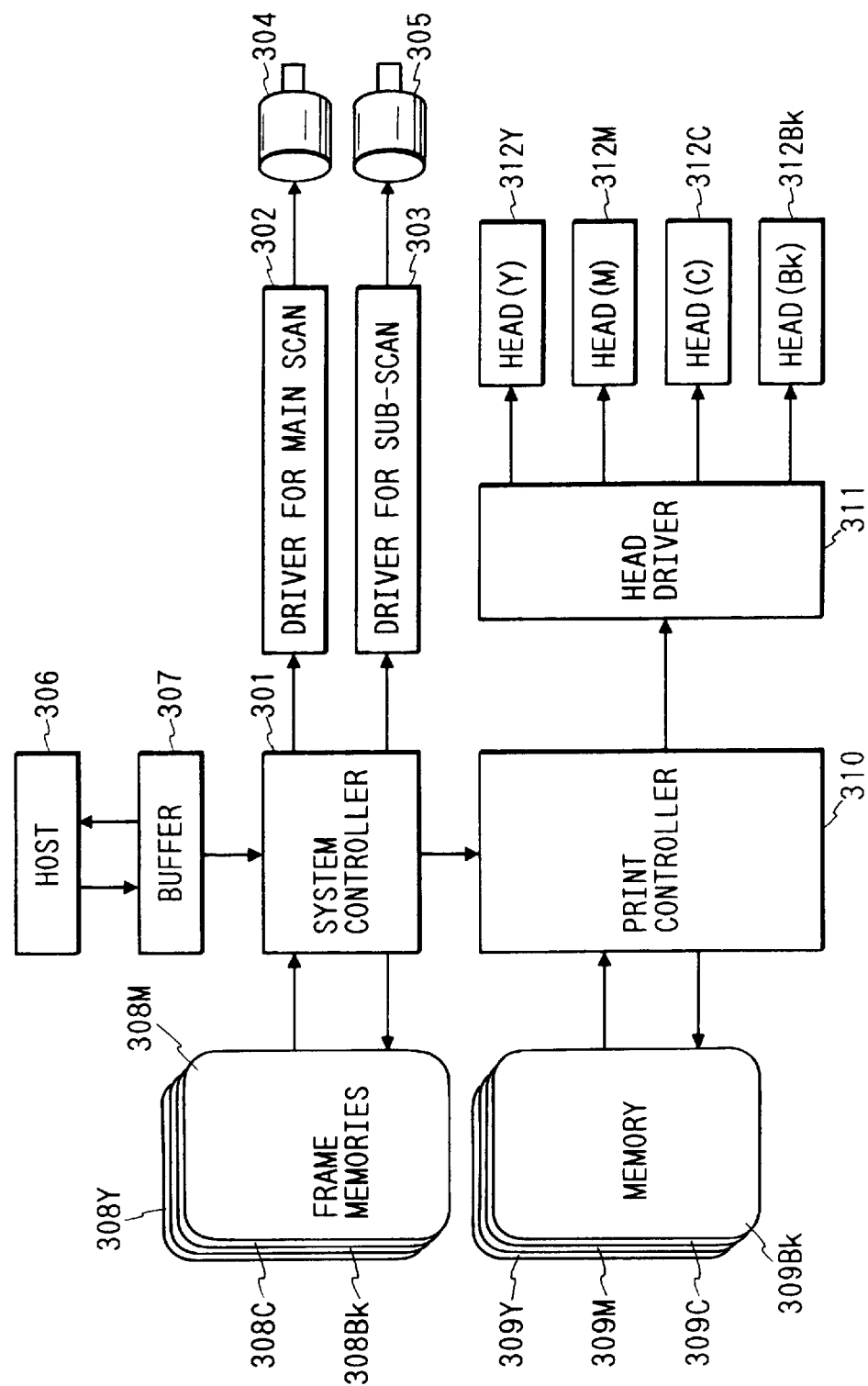
FIG. 8 is a block diagram of a control circuit of the ink jet recording apparatus in which the present invention is applicable.

FIG. 8 is a block diagram of the control system of the color ink jet recording apparatus explained above.

A system controller 301, for controlling the entire apparatus, is provided therein with a microprocessor, a ROM storing control program, a RAM utilized by said microprocessor in the program execution, etc.

There are also provided a driver 302 for driving the printing head in the main scanning direction; a driver 303 for driving the printing head in the sub scanning direction; and motors 304, 305 activated by the information on the speed and moving distance from the corresponding drivers.

A host computer 306 transfers the information to be printed to the recording apparatus of the present invention. A reception buffer 307 temporarily stores the data from said host computer, and retains said data until they are read by the system controller 301. A frame memory 308, for developing the data to be printed into image data, has a memory size required for the printing. In the present embodiment, said frame memory is assumed to be capable of storing data of a recording sheet, but the present invention is not limited by the size of the frame memory.

A memory device 309 temporarily stores the data to be printed, and its memory capacity varies according to the number of discharge openings of the printing head. A print control unit 310 controls the discharge speed, number of printed data etc. for controlling the printing head according to the instruction from the system controller 301. A driver 311, for controlling the heads 312Y, 312M, 312C, 312Bk, is controlled by the signal from said print control units 310.

Figure 9A:
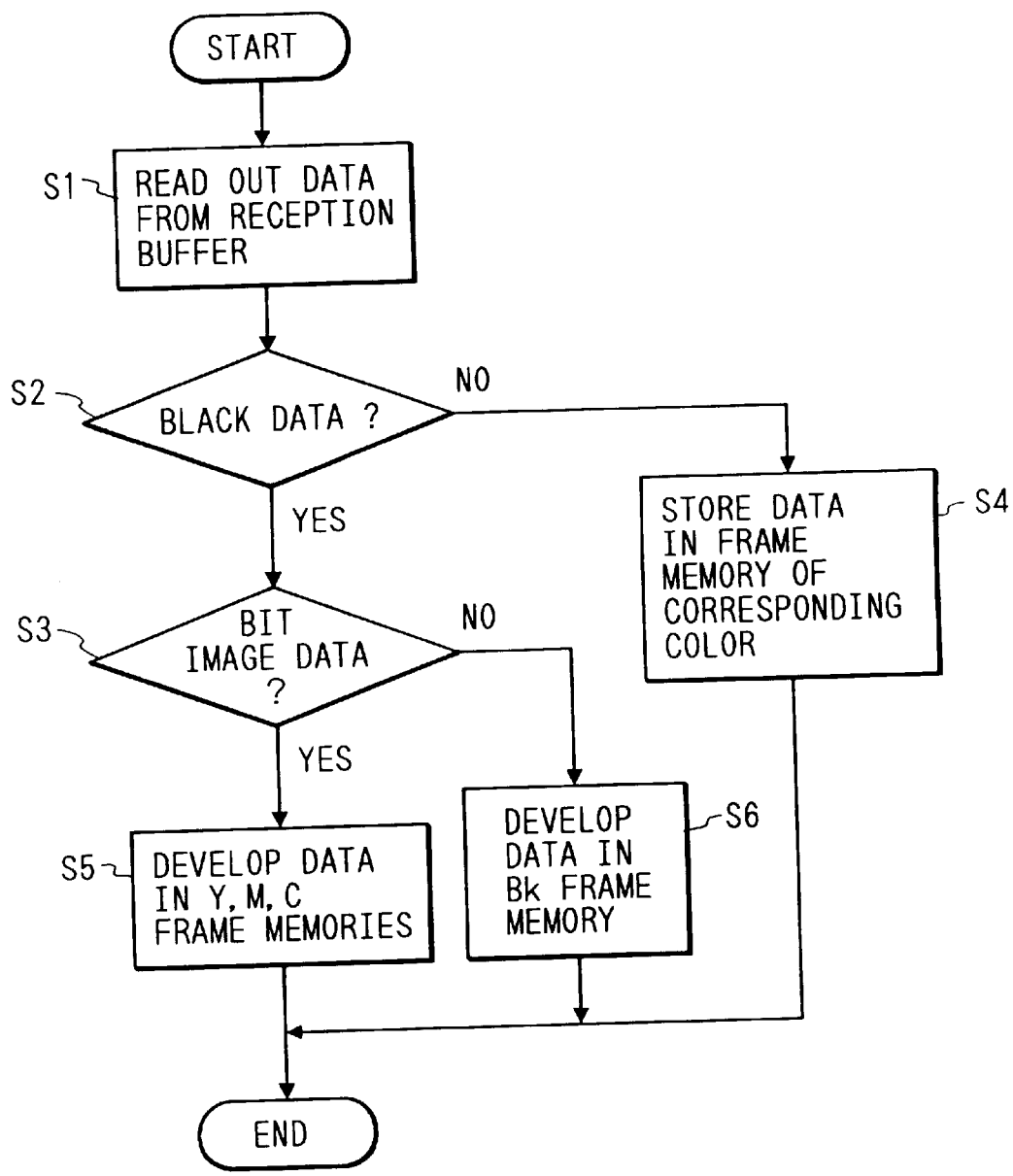
FIGS. 9A and 9B are flow charts of the control sequence of a second embodiment.
Figure 9B:
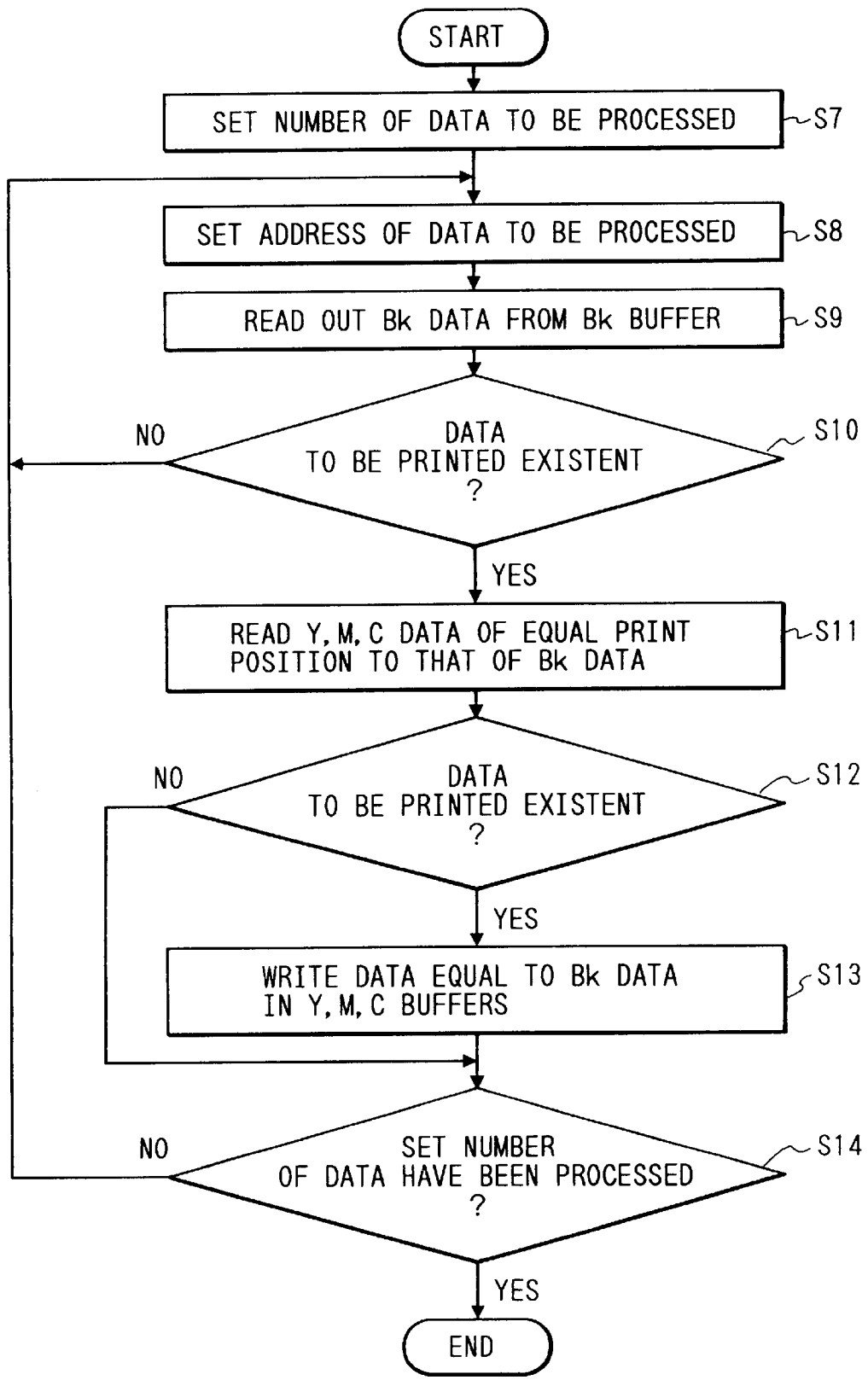

FIGS. 9A and 9B show the control sequence of the present embodiment. A step S1 is the first step of processing of the data transferred from the host computer 306 shown in FIG. 8 to the reception buffer 307 by the system controller 101. This step reads thus stored data. A step S2 discriminates whether thus read data are those of a color other than black, and, in case of color data, a step S4 stores the data in the designated frame memory 308 shown in FIG. 8.

In case of black data, a step S3 discriminates whether said data are bit image data or character code data, and, in case of bit image data, a step S5 develops same data in the frame memories 308M, 308C, 308Y shown in FIG. 8, but, in case of character code data, a step S6 develops the data in the Bk frame memory.

A step S7 sets the number of the data processed, and a step S8 sets the address of the process. Then a step S9 reads the data from the Bk buffer, and a step S10 discriminates whether the data to be printed are present. If absent, the sequence proceeds to a step S14 for discriminating whether the processing of the predetermined data number has been completed, and, if not, the sequence returns to the step S8 for continuing the data processing. On the other hand, if the data to be printed are present, a step S11 reads the data of other colors (Y, M, C) in the same print position, then a step S12 discriminates whether thus read data contain data to be printed, and, if present, a step S13 writes the Bk data in the Y, M and C buffers. If such data to be printed are absent, the Bk data are left unchanged in the buffer.

A step S14 discriminates whether the processing of the predetermined data number has been completed, and the above-explained process is repeated until the processing is completed. The above-explained processing can be applied at least to a dot.

Figure 12A:
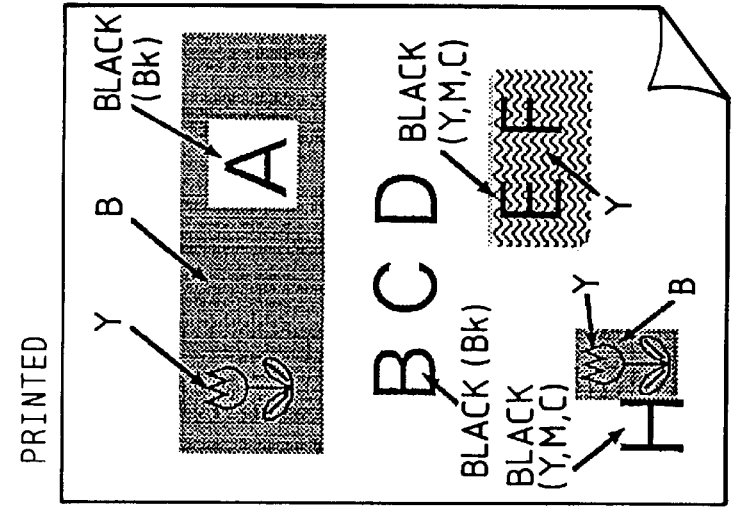
FIGS. 12A to 12C are views showing the results of printing in the second, third and fourth embodiments.
Figure 13A:
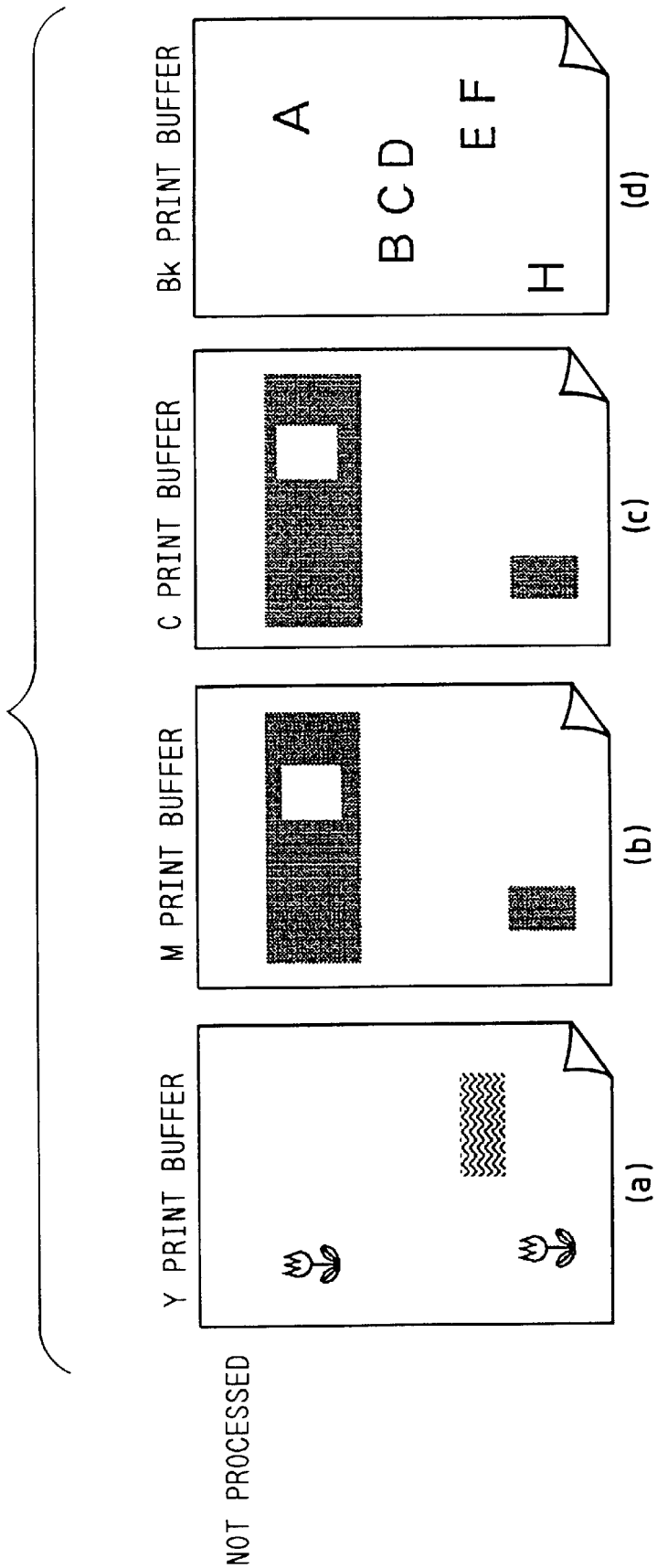
FIGS. 13A and 13B are views showing the contents of the buffer before and after the processing in the second embodiment.
Figure 13B:
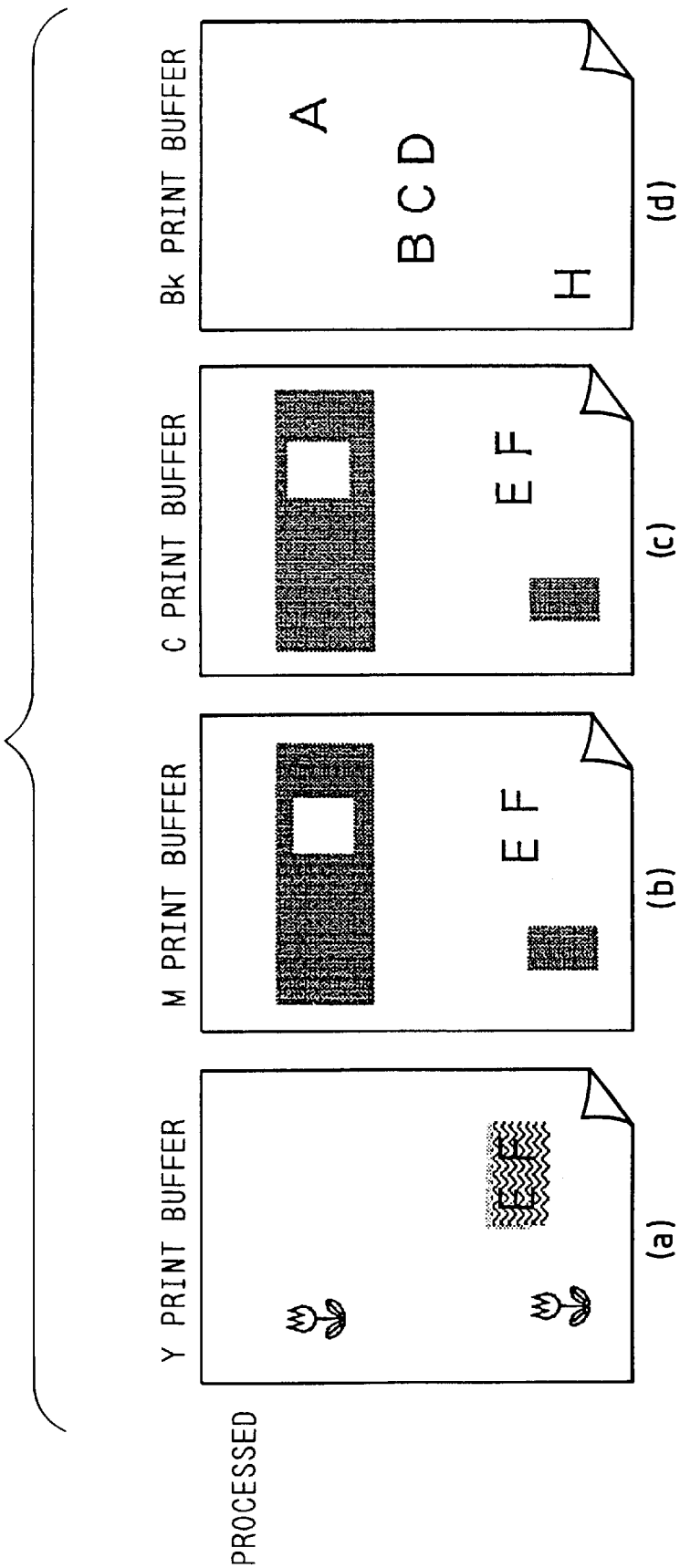

Now the present embodiment is explained with reference to FIGS. 13A and 13B. The character code data are all developed in the Bk buffer, immediately after the development in the buffer ((a) to (d) in FIG. 13A). After the processing ((a) to (d) in FIG. 13B), the characters "EF" are developed in the Y, M and C buffers, so that the characters "EF" alone are printed with the Y, M and C colors as shown in FIG. 12A.

As explained in the foregoing, the Bk data present in the same print positions as those of the C, M or Y data are printed with the C, M and Y inks. Thus there can be alleviated the blotting between the black and other colors.
Embodiment 3

The 3rd embodiment constitutes an improvement over the 2nd embodiment.

In the 2nd embodiment, the development of the Bk data is judged by the color data in the same print positions as those of the Bk data, and the Bk data are developed in the Y, M and C buffers. On the other hand, in the 3rd embodiment, said development is judged by the data of at least an adjacent pixel, and the Bk data are developed in the Y, M and C buffers.

Figure 12B:
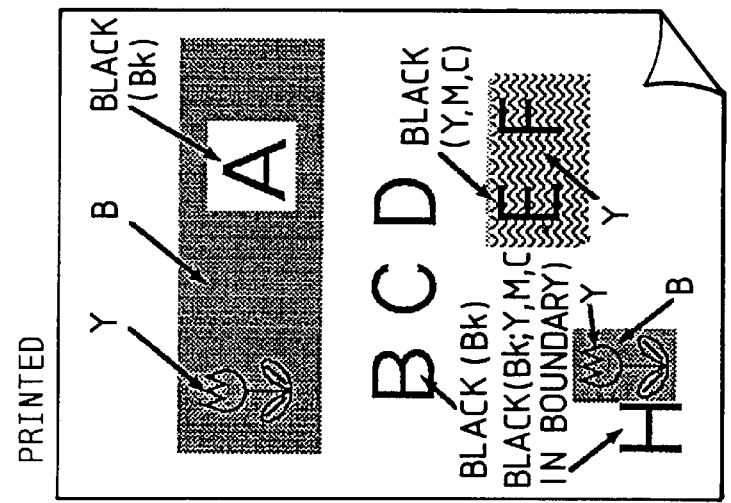
Figure 12C:
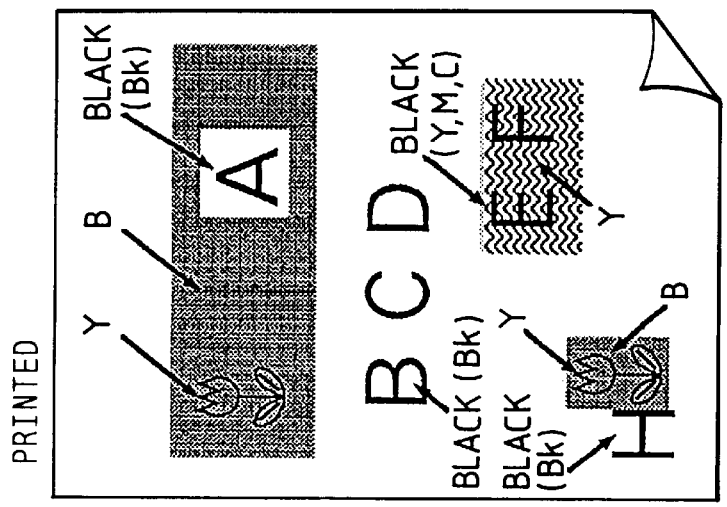
Figure 14B:
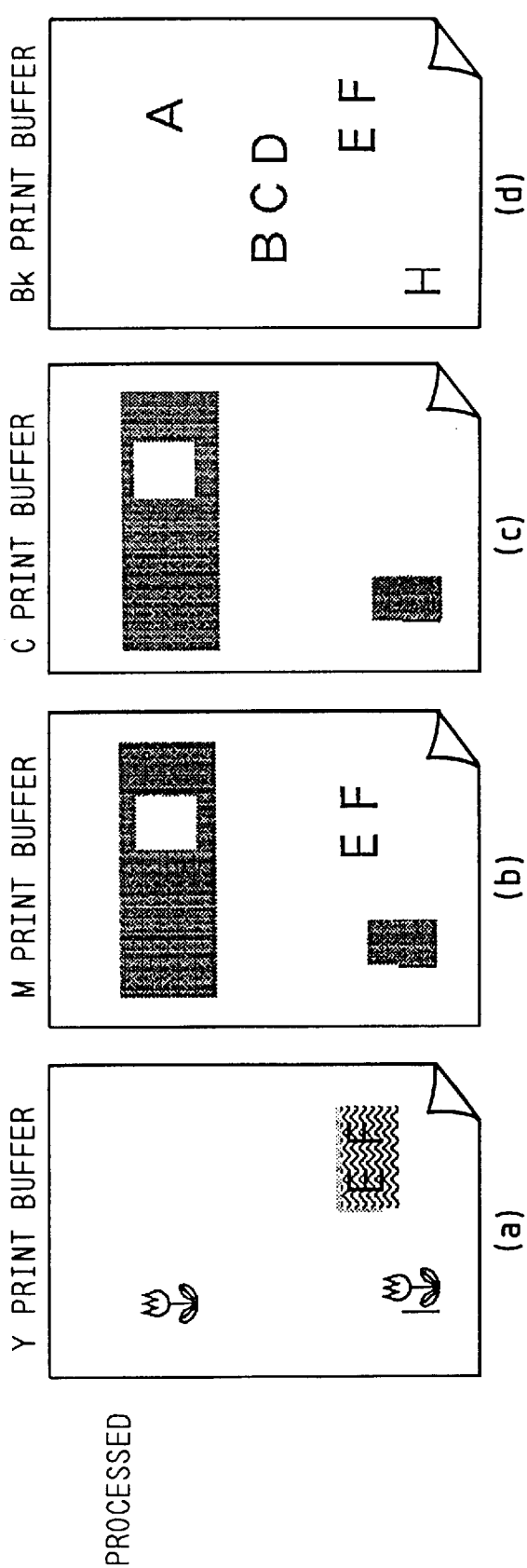

The present embodiment will be explained with reference to FIGS. 14A and 14B. The character code data are all developed in the Bk buffer, immediately after the development in the buffers ((a) to (d) in FIG. 14A). After the processing ((a) to (d) in FIG. 14B), the data "EF" are developed in all the Y, M and C buffers, and, as shown in FIG. 12B, a dot adjacent to the bit image data of "EF" or "H" is printed with the Y, M and C inks. The remaining part of "H" is printed with the black ink.

Figure 10A:
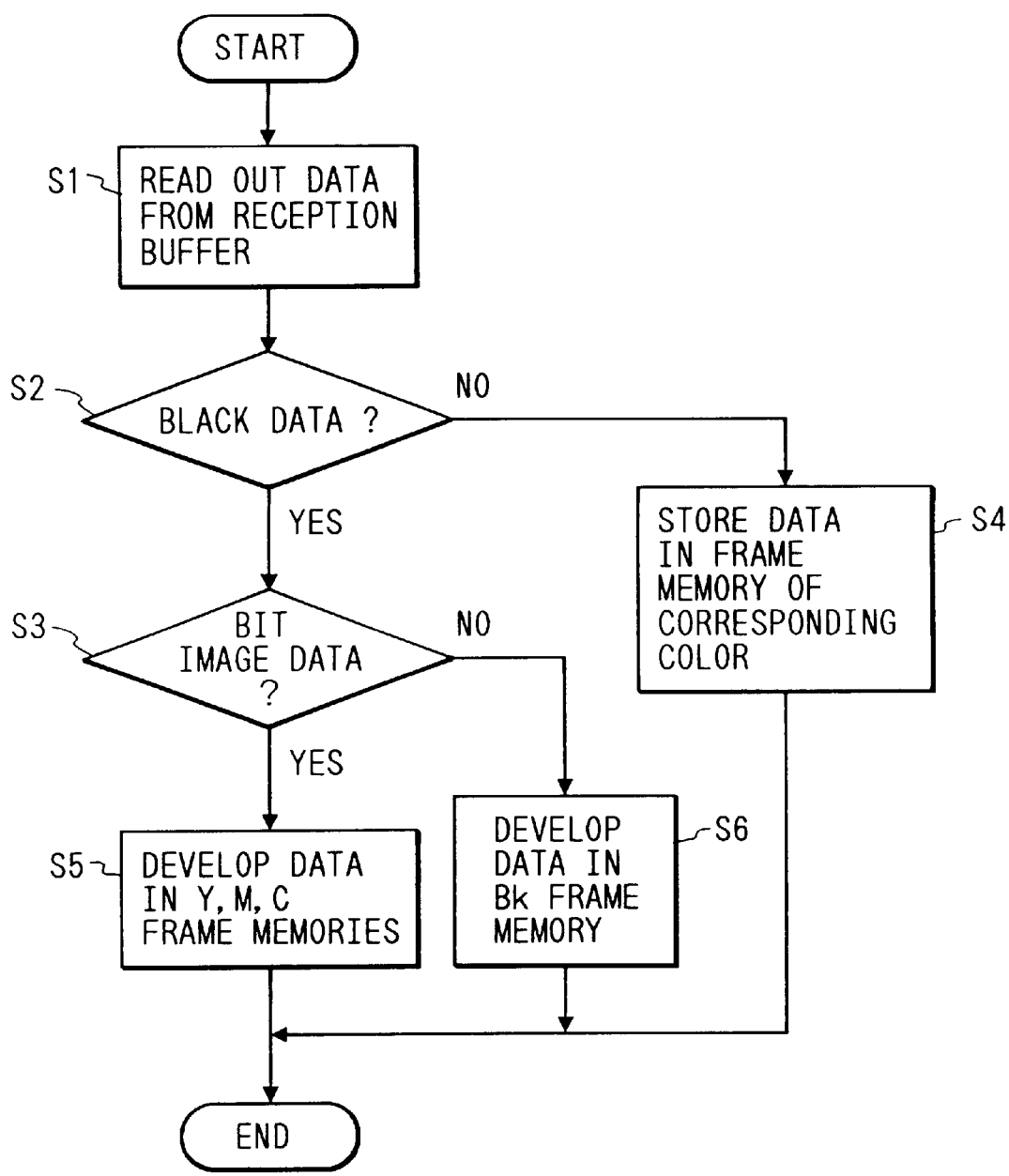
FIGS. 10A and 10B are flow charts of the control sequence of a third embodiment.
Figure 10B:
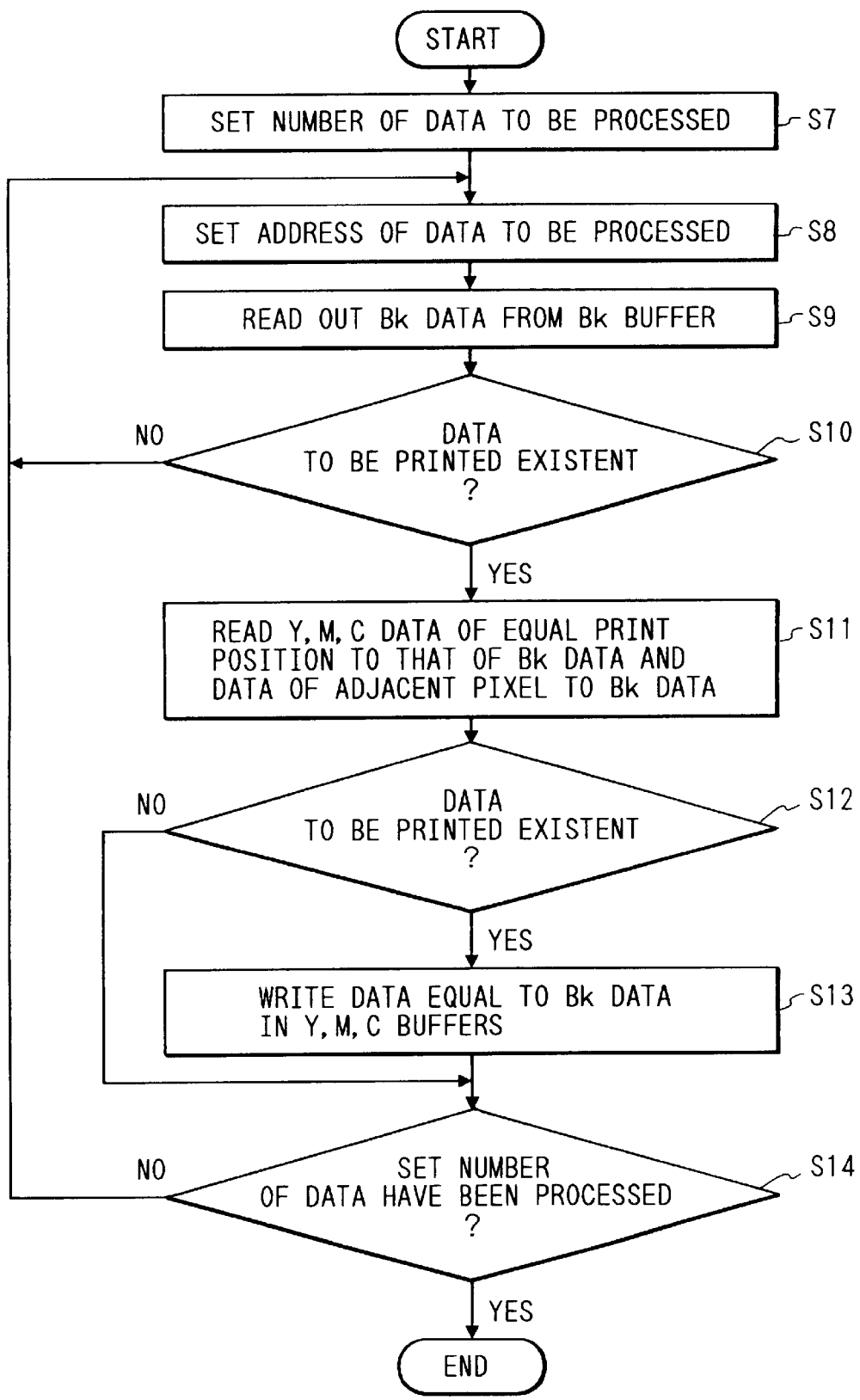

The sequence of the above-mentioned processing will be explained in detail, with reference to a flow chart shown in FIGS. 10A and 10B.

Steps S1 to S10 are same as those of the 2nd embodiment shown in FIGS. 9A and 9B. A step S11 reads the data of other colors (Y, M, C) in the same print positions and in the adjacent pixels, and discriminates whether data to be printed are present in these positions. If a step S12 identifies data even in a pixel in these positions, a step S13 writes the Bk data in the Y, M and C buffers. If such data are absent, the Bk data are left unchanged in the buffer.

A step S14 discriminates whether the processing of the predetermined data number has been completed, and the above-explained sequence is repeated until the predetermined processing is completed. The above-mentioned processing can be applied at least to a dot, to all the dots within an area recordable on the recording paper.

As explained above, the Bk data of which print positions are same as or adjacent to those of the C, M or Y data are printed with the C, M and Y inks. Consequently the blotting is alleviated not only where the black and another color are superposed but also where the black and another color are adjacent.

Embodiment 4

Figure 15B:
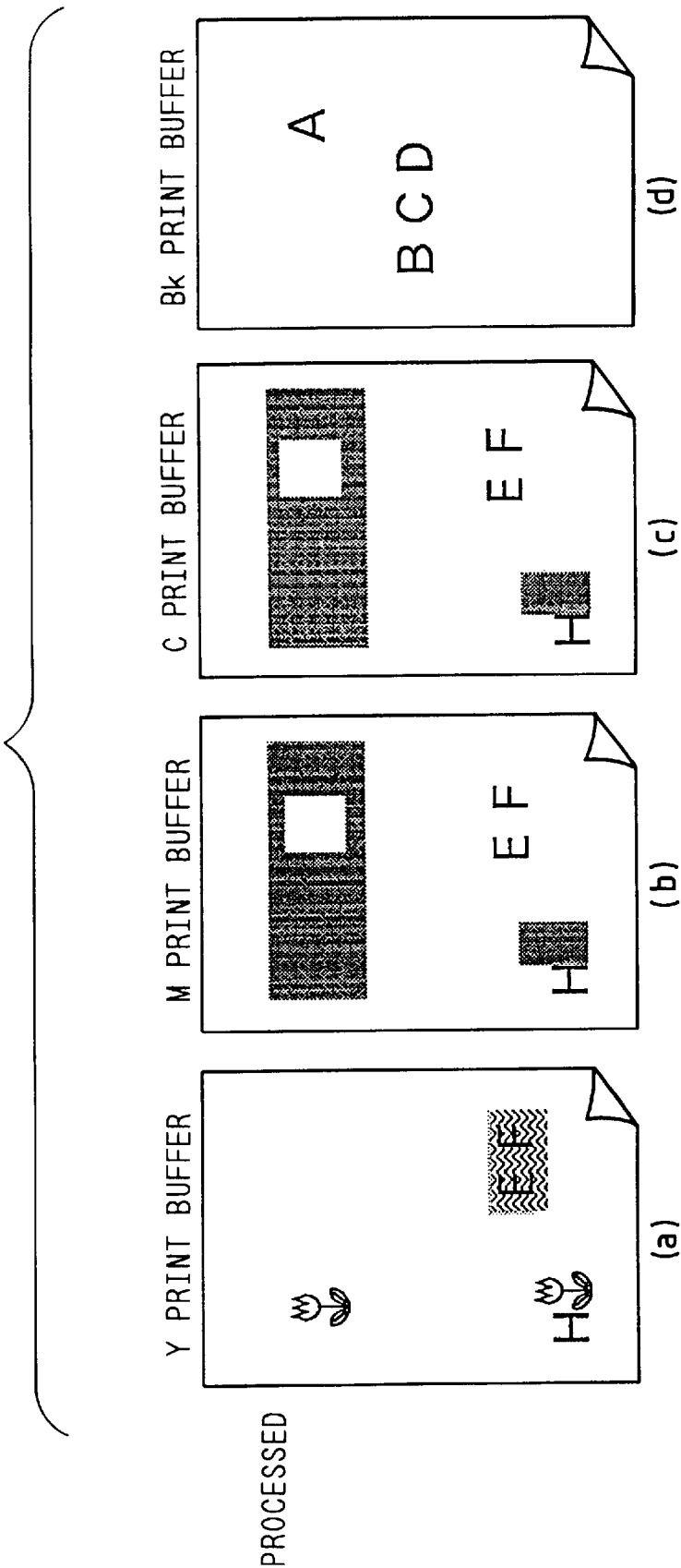

FIGS. 15A and 15B illustrate the feature of the 4th embodiment.

(a) to (d) in FIG. 15A illustrate the results of development of the black character code data into the Bk buffer and the black bit image data into the Y, M and C buffers, as in the 2nd and 3rd embodiments.

After the processing, in the 3rd embodiment, an area of a width of one dot, at the right-hand side of the character "H", is developed into the Y, M and C buffers. In the present embodiment, as shown in (a) to (d) in FIG. 15B, the entire character "H" is developed into the Y, M and C buffers.

Figures 11, 11A:
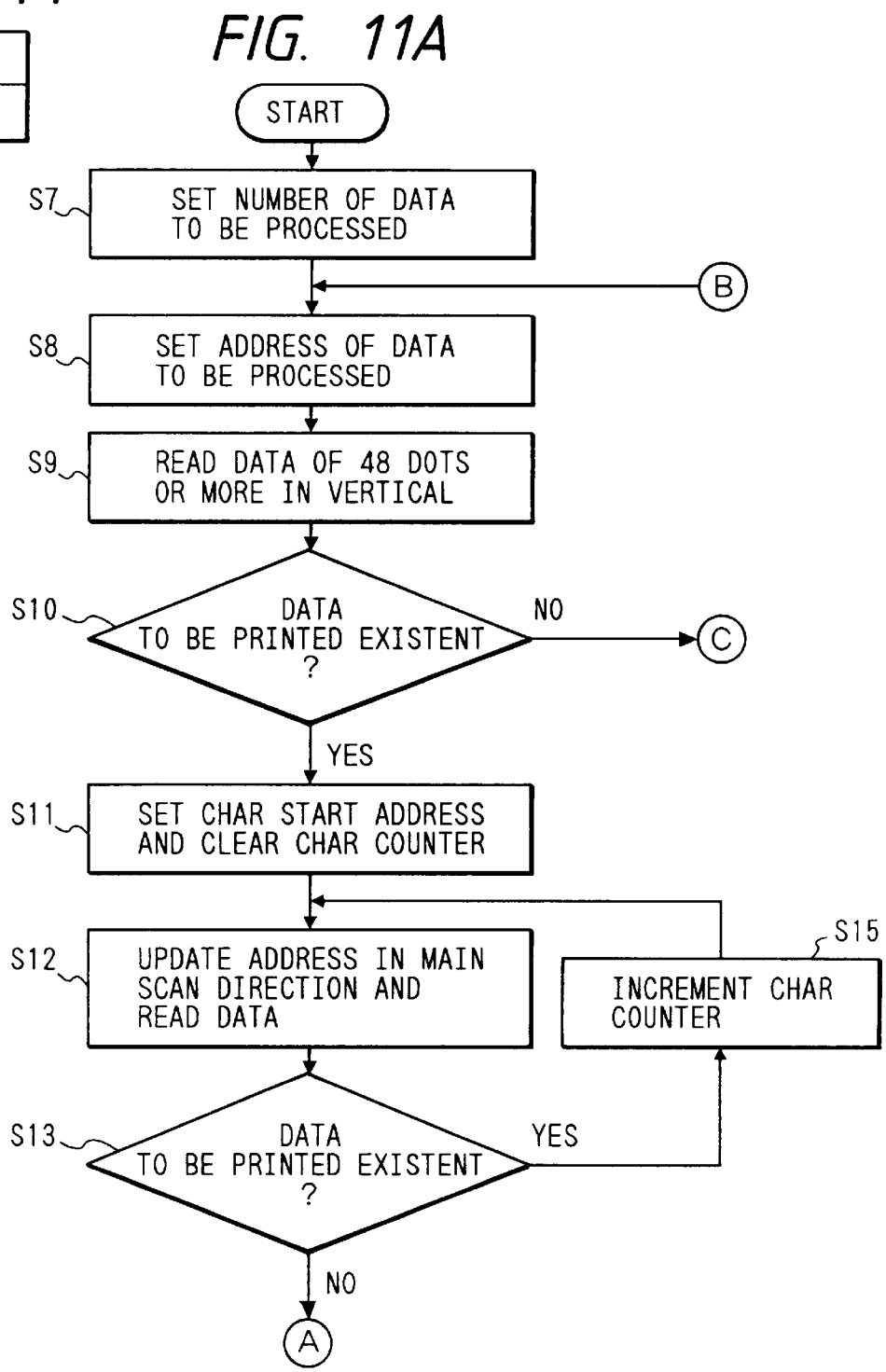
FIG. 11 is comprised of FIGS. 11A and 11B showing flow charts of the control sequence of a fourth embodiment.
Figure 11B:
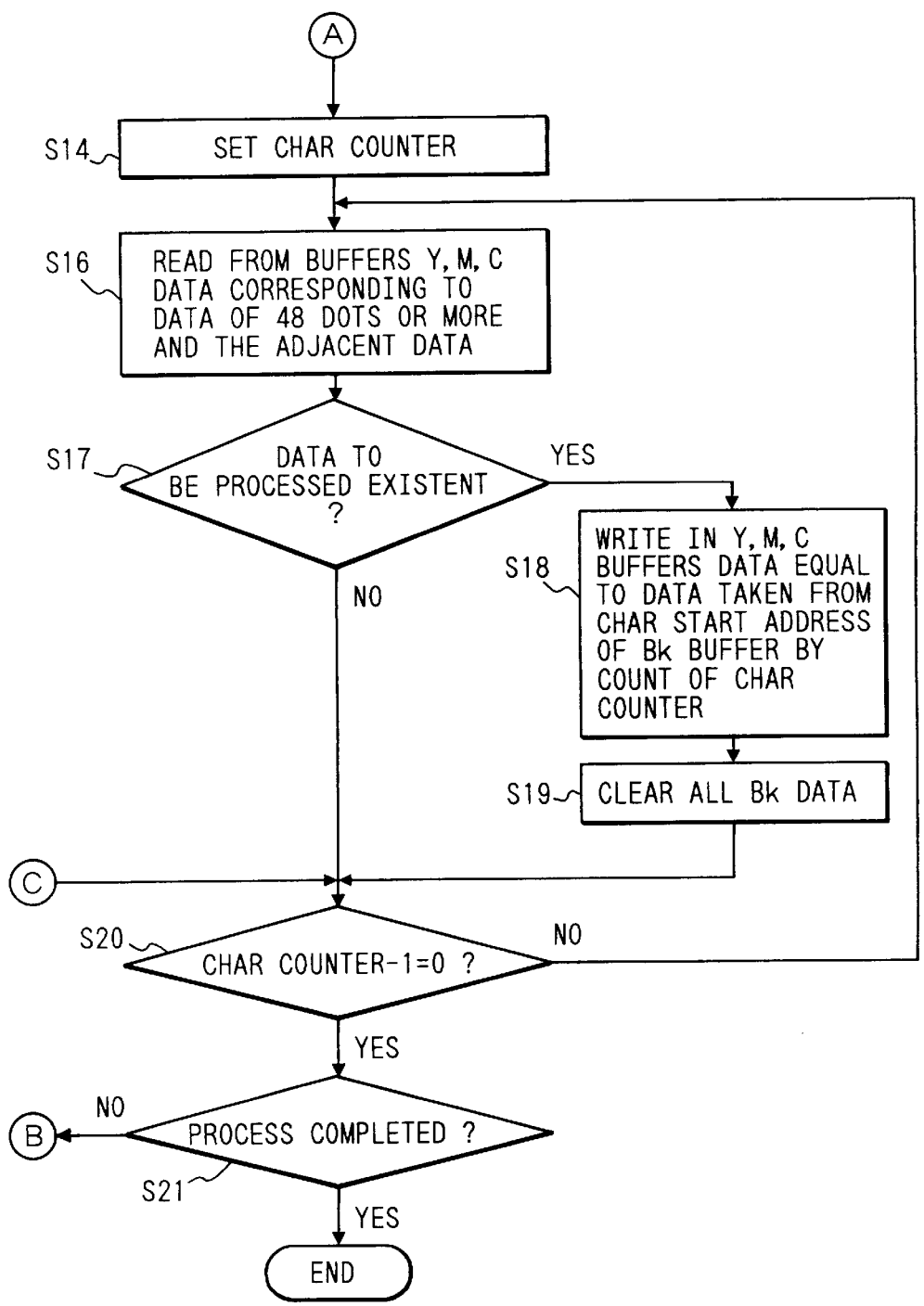

This sequence will be explained in detail by a flow chart shown in FIGS. 11A and 11B.

Steps S1 to S8 are same as those in the 2nd and 3rd embodiments. In the foregoing two embodiments, the step S9 reads the data of at least a dot from the Bk buffer. In the present embodiment, for recognizing a character, this step S9 reads data of at least the vertical size of a character.

Figure 16:
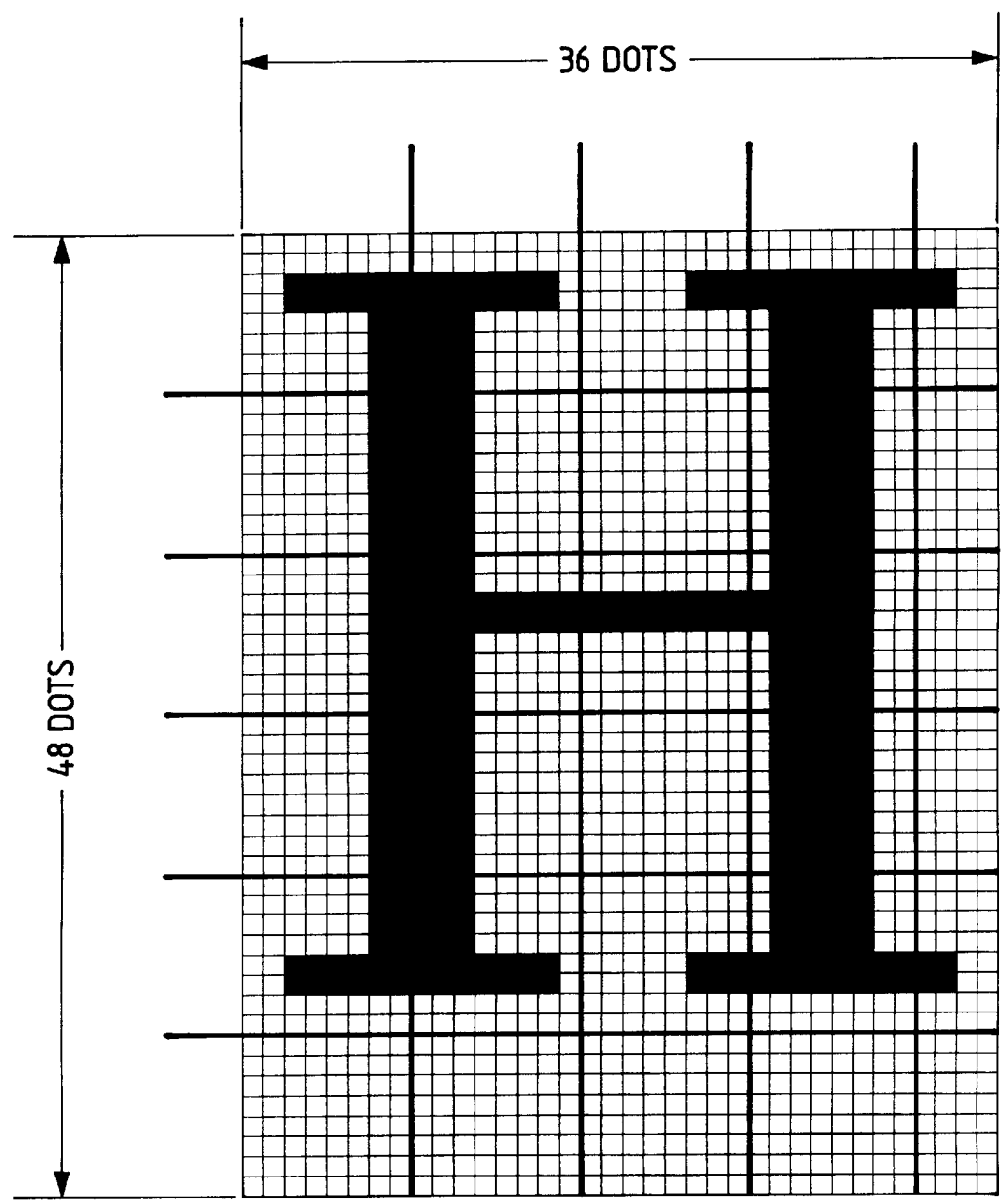
FIG. 16 is a view showing an example of the font data in the fourth embodiment.

In case of a recording apparatus of a resolution of 360 dpi, the size of a character of a width of 10 cpi and a height of 10 point corresponds to 48 dots in the vertical direction as shown in FIG. 16, so that the data of at least 48 dots are required for character recognition. Thus the step S9 reads the vertical data of at least 48 dots, and a step S10 discriminates whether data to be printed are present therein. If absent, the sequence proceeds to a step S20 for continuing the processing.

If the data to be printed are present in the vertical data of at least 48 dots, a step S11 sets a character start address and clears a character counter. Then a step S12 renews the address in the main scanning direction, and reads the above-mentioned data of 48 vertical dots. If a step S13 identifies the presence of the data to be printed, and step S15 effects an increment of the character counter, then the sequence returns to the step S12.

If the step S13 identifies the absence of the data to be printed, a step S14 sets the character counter. A step S16 reads, in succession from the character start address set in the step S14, the Y, M, C data positionally corresponding to black data of 48 dots or more in vertical and black data of one dot or more adjacent thereto, from respective buffers. If a step S17 identifies the absence of data to be printed in the thus read data, the Bk data are not altered, and the processing is continued until the character counter reaches 0 in a step S20. On the other hand, if the data to be printed are present, even in a dot, in the data read from the Y, M and C buffers, a step S18 writes, from the character start address of the Bk buffer, the data corresponding to the character counter into the Y, M and C buffers. Then a step S19 clears the Bk data which have thus been written into the buffers. Thereby, the Bk data are converted into Y, M, C data. Then a step S21 discriminates whether the processing of the predetermined data number has been completed, and, if not, the above-explained steps are repeated until the predetermined processing is completed.

The data thus processed are printed on the recording paper according to the instruction of the system controller 301 shown in FIG. 8.

As explained in the foregoing, the Bk character data in the print positions same as or adjacent to those of the C, M or Y data are printed with the Y, M and C inks. Thus the color blotting can be alleviated without a variation in hue within a character.

Embodiment 5

In this embodiment, black bit image data transferred from the host computer 306 shown in FIG. 8 are stored in the Y, M and C buffers. Then, if color data are not transferred, the Y, M and C data are written into the Bk buffer, the data in the Y, M, C buffers are deleted and the characters are printed with the Bk ink only.

Figure 17:
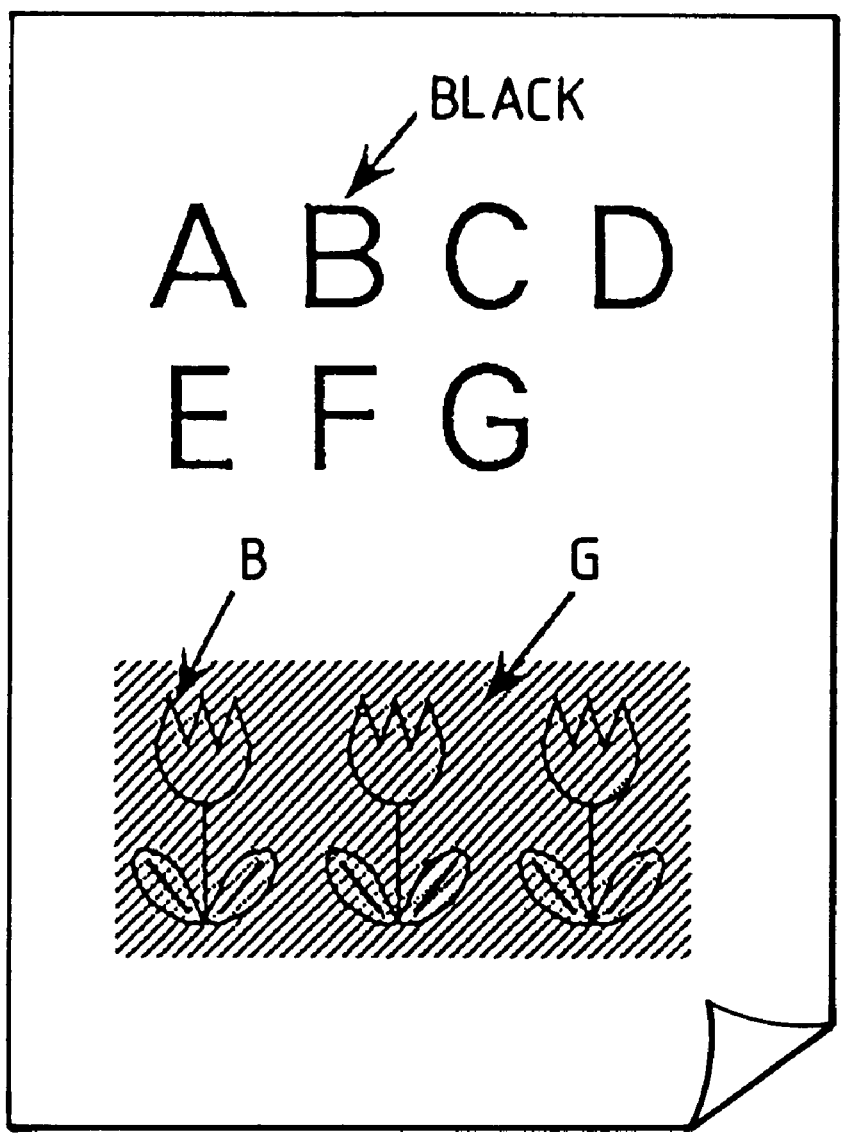
FIG. 17 is a view showing the result of printing in a fifth embodiment.

FIG. 17 illustrates a case in which characters "ABCDEFG" and a lower pattern are all transferred by the bit image data. In such case, as shown in (a) to (d) in FIG. 18A, the characters "ABCDEFG" are all developed in the Y, M, C buffers. This can be attained in the same manner as in the foregoing 2nd to 4th embodiments.

Figure 18A:
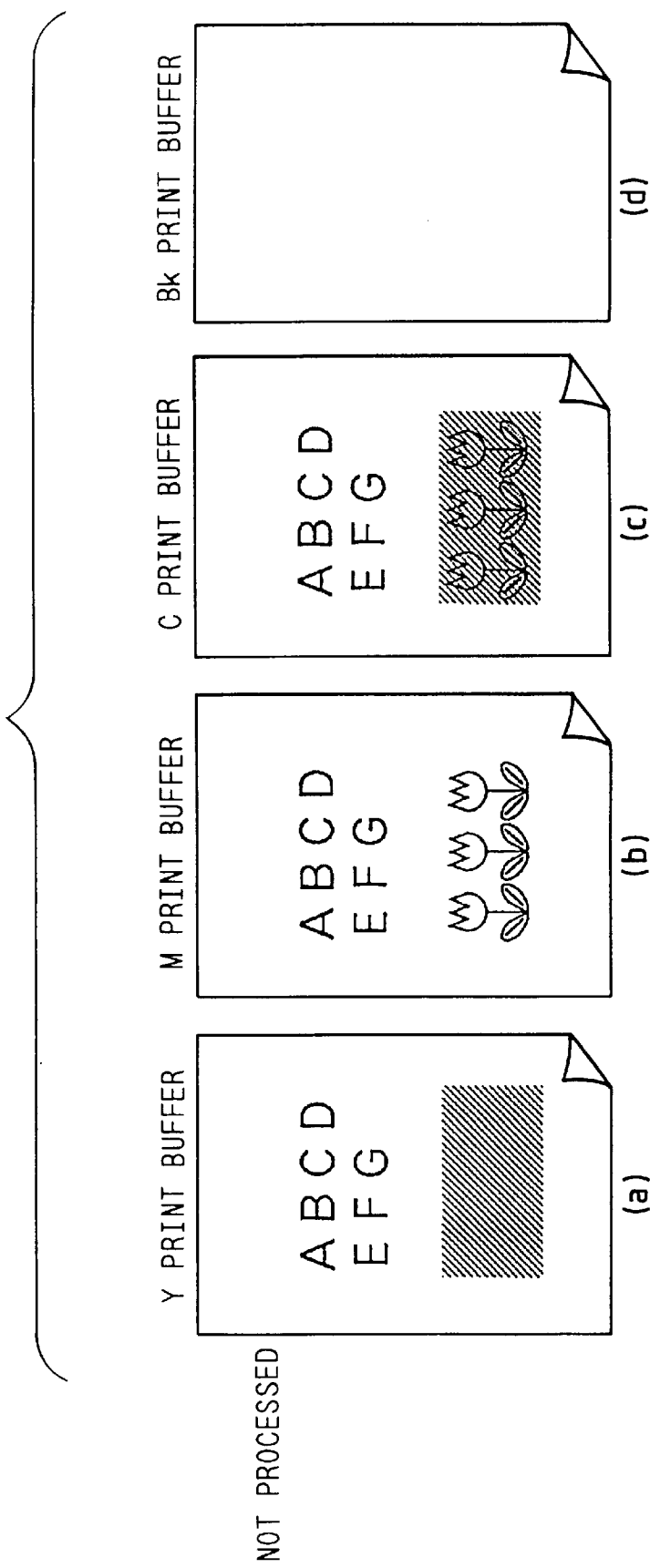
FIGS. 18A and 18B are views showing the contents of the buffer before and after the processing in the fifth embodiment.
Figure 18B:
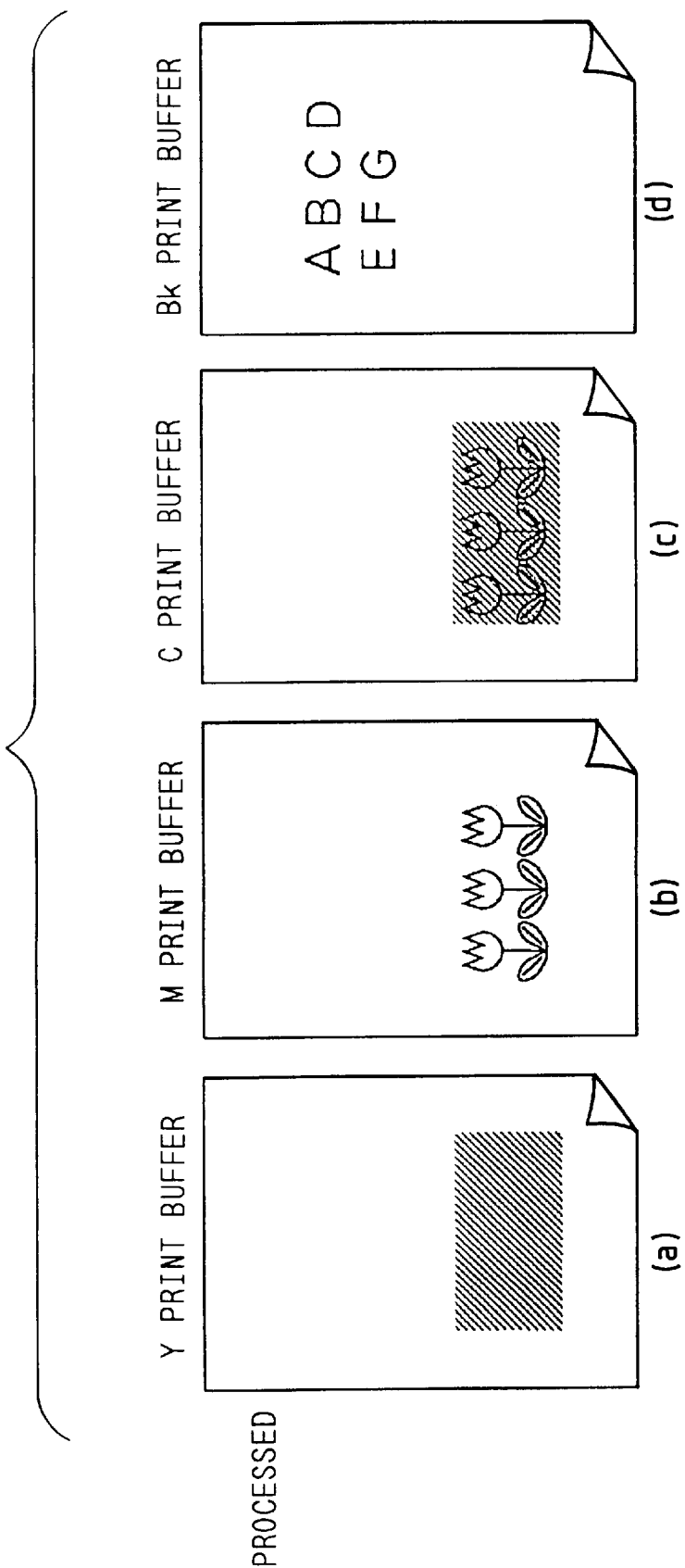

In case black data "ABCDEFG" alone exist as in the upper half of the recording sheet, the data "ABCDEFG" are developed in the Bk buffer and the data in the C, M, Y buffers are deleted, as shown in (a) to (d) in FIG. 18A.

Figure 19B:
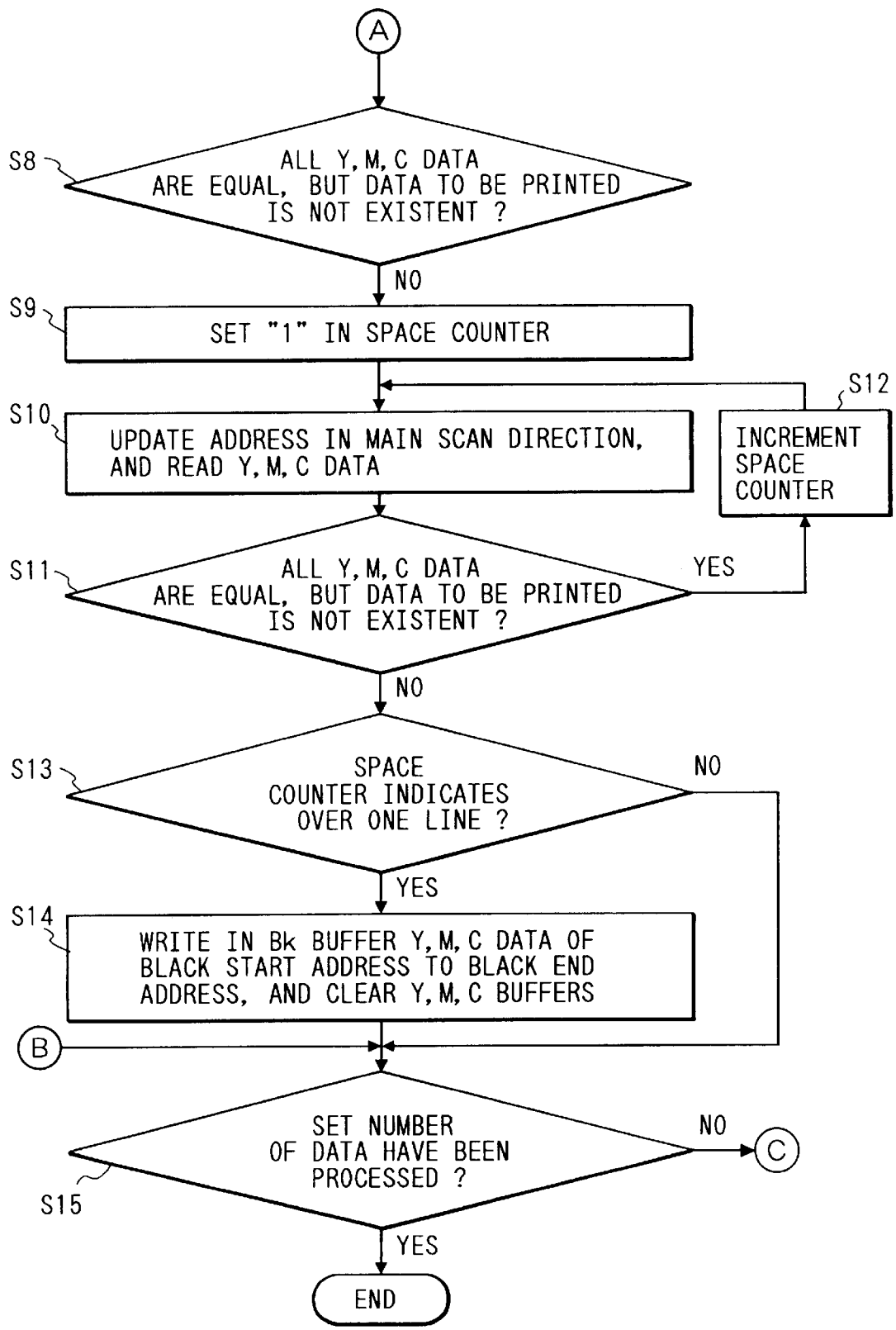
FIG. 19 is comprised of FIGS. 19A and 19B showing flow charts of the control sequence of the fifth embodiment.

In the following, the sequence of the present embodiment will be explained in detail, with reference to a flow chart shown in FIG. 19, and it is assumed that all the data have been developed into the buffers.

A step S1 sets, for each of the C, M and Y colors, an address of the data to be processed. Said addresses correspond to a same print position on the recording paper. Then a step S2 read the Y, M, C color data from the buffers. Said data reading can be executed with any number of dot, from a dot to a number of dots corresponding to the recording sheet.

If a step S3 identifies data to be printed, identical for the Y, M and C data, a step S4 sets a black start address (print position with the black ink), and clears a black end address.

Then a step S5 renews the address in the main scanning direction, and reads the data of the different colors. Then if a step S6 identifies same data to be printed in the Y, M and C colors, a step S7 renews the black end address. If there exist the same data to be printed in the different colors, the sequence of the steps S5 to S7 is executed in continuation. If the processing is completed in the main scanning direction, the address is renewed in the sub scanning direction, and the above-explained processing is executed in continuation.

If the discrimination in the step S6 turns out negative and if a step S8 identifies the absence of same data to be printed, a step S9 sets "1" in a blank counter. Then a step S10 renews the address in the main scanning direction, and reads the data of the different colors. Then, if a step S11 identifies the absence of the same data to be printed, a step S12 effects an increment of the blank counter.

On the other hand, if the discrimination of the step S11 turns out negative, a step S12 discriminates whether the count of the blank counter exceeds a main scanning line. If said scanning line is exceeded, a step S13 writes the Y, M, C data from said black start address to the black end address into the Bk buffer, and clears the C, M and Y buffers and the blank counter. Then a step S14 discriminates whether the processing of the predetermined data number has been completed, and, if not, the sequence returns to the step S1 for continuing the processing.

Also when the step S12 identifies that the count of the blank counter does not exceed a main scanning line, the step S14 similarly discriminates whether the processing of the predetermined data number has been completed, and, if not the sequence returns to the step S1.

The method of converting the bit image data into the Bk data in the unit of a block defined by the detection of the blank line can reduce the amount of consumption of the inks, and can improve the print quality because of absence of superposition of the inks, in comparison with the method of printing black color with three color inks.

The present embodiment can be combined with any of the foregoing 2nd to 4th embodiments, and the advantage remains basically same also in such combination.

As explained in the foregoing, the present embodiment can reduce the blotting between the black ink and other color inks of yellow, magenta and cyan colors, while maintaining the print quality of the characters.

Embodiment 6

Figure 7:
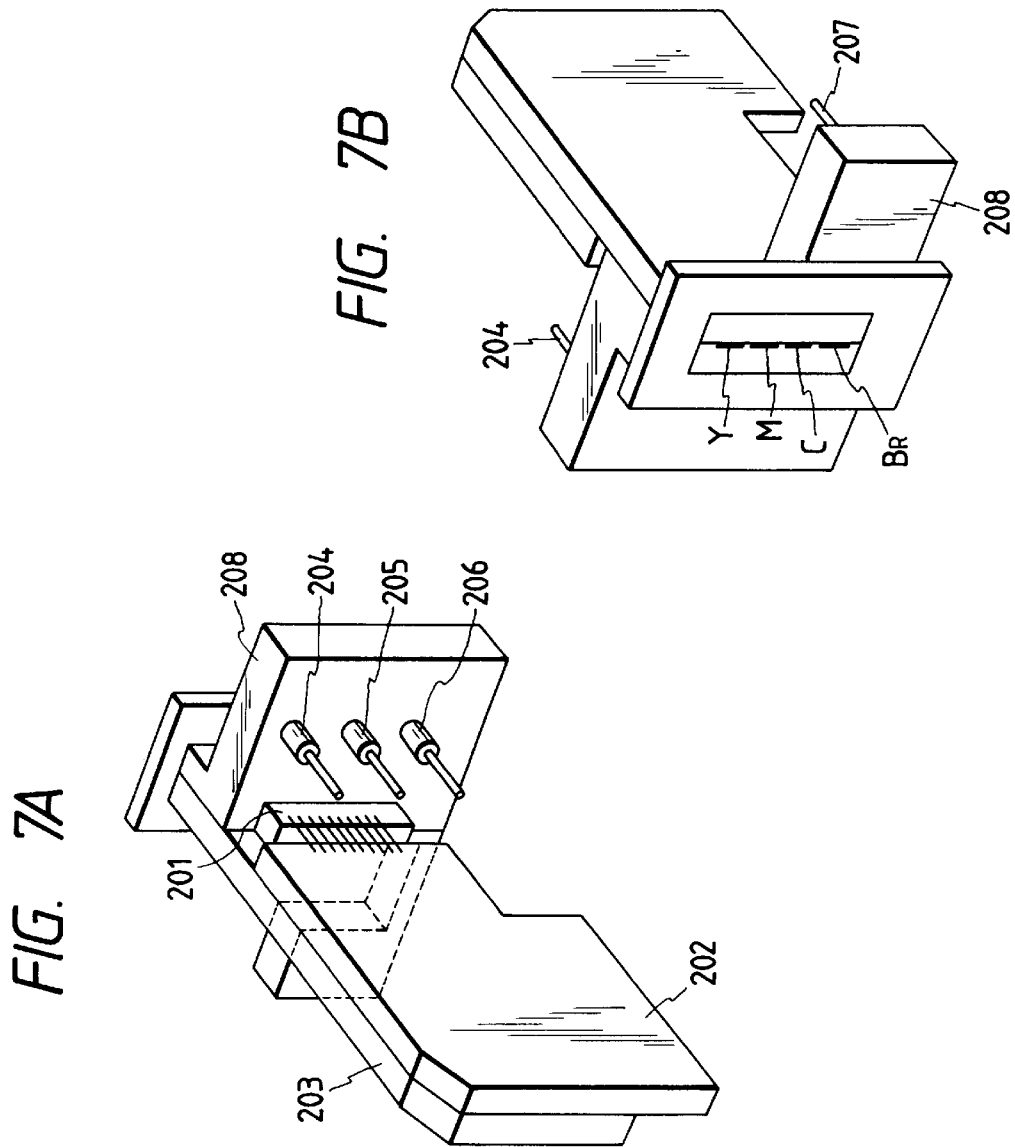
FIGS. 7A and 7B are views showing a head mechanism for the ink jet recording apparatus in which the present invention is applicable.

The recording apparatus and the recording head in which the present embodiment is applicable will not be explained as they are similar to those in the foregoing embodiments 2 to 5, as represented in FIGS. 6 to 8.

The compositions of the inks employed in the present embodiment are shown in Table 4.

TABLE 4

| 1) | Y (yellow) ink | |
|---|---|---|
| | C.I. direct yellow 86 | 3 parts |
| | Diethylene glycol | 10 parts |
| | Isopropyl alcohol | 2 parts |
| | Urea | 5 parts |
| | ACETYLENOL EH (Kawaken Chemical) | 1 part |
| | Water | remainder (or balance) |
| 2) | M (magenta) ink | |
| | C.I. acid red 289 | 3 parts |
| | Diethylene glycol | 10 parts |
| | Isopropyl alcohol | 2 parts |
| | Urea | 5 parts |
| | ACETYLENOL EH (Kawaken Chemical) | 1 part |
| | Water | remainder |
| 3) | C (cyan) ink | |
| | C.I. direct blue 199 | 3 parts |
| | Diethylene glycol | 10 parts |
| | Isopropyl alcohol | 2 parts |
| | Urea | 5 parts |
| | ACETYLENOL EH (Kawaken Chemical) | 1 part |
| | Water | remainder |
| 4) | Bk (black) ink | |
| | C.I. direct black 154 | 3 parts |
| | Diethylene glycol | 10 parts |
| | Isopropyl alcohol | 2 parts |
| | Urea | 5 parts |
| | Water | remainder |

In contrast to the Bk ink, the C, M or Y ink is improved in penetrability by the addition of ACETYLENOL EH by 1%. Other surfactants or alcohols may also be added.

FIG. 21 is a flow chart showing the control sequence of the 6th embodiment.

A step S1 causes the system controller 301 to read the data, transferred from the host computer 306 and stored in the reception buffer 307. A step S2 discriminates whether the read data contain black data or consist of color data other than black, and the sequence proceeds respectively to a step S7 or S10.

A step S7 refers to black data, and discriminates whether color data are present in positions adjacent to the periphery of a black image recording area. The adjacent positions mean "upper and/or lower and/or left and/or right" positions to each pixel constituting a black image area on the recording medium, and there is discriminated whether at least a color recording pixel constituting a color image area is present in such position. The pitch P of the pixels is about 70.56 $\mu$m, and the recording density is 360 dpi. The sequence proceeds to a step S8 or S9 respectively if a color pixel is present or absent adjacent to the black recording pixels.

The step S8 develops the black recording pixels in the C, M and Y data buffers for color recording. The step S9 develops the black recording pixels in the Bk data buffer for black recording. Then a step S10 develops the color data of different colors in the data buffers of respective colors. A step S11 reads the data from the reception buffer, and discriminates whether data to be printed are present and whether data of a page have been received. If the data to be printed are absent, or if the data to be printed are present and the data of a page have been received, the sequence proceeds to a step S12. Otherwise the sequence returns to the step S1. The step S12 executes the recording operation, by activating the recording head 102.

The process of the present embodiment will be explained with the image example shown in FIGS. 20A to 20C. The image portion A, consisting of black color only without the background color, or consisting of black image areas not contacted by color image areas, is printed with the black ink recording head. The image portion B is similarly printed with the black ink recording head. In the image portions C and D, the black images, being completely surrounded by the images of other colors, are recorded with the three Y, M and C color inks. In the image portion E, among the black bit image data, the numeral "1" is printed with the black recording head, as it is not in contact, in the periphery thereof, with a color image. The numeral "3" is recorded with the color ink recording heads, as it is completely surrounded by the magenta image. The numeral "2" is printed with the color ink recording heads, as it is adjacent, in a part of the periphery, with the magenta image.

As explained above, an independent black image area, without contacting another color image area, is recorded with the Bk ink of a high print density, with suppressed feathering phenomenon. A non-independent black image area, at least partially contacting or superposed with another color image area, is printed with the C, M and Y inks. In this manner there can be obtained a color image of high quality, in which the color blotting between the black color and other colors.

The discrimination of the presence of color image data in the pixels adjacent to the periphery of the black image area is executed by a software in the present embodiment, but it may also be achieved by a hardware.

Embodiment 7

The embodiment 6 discriminates the presence of other color image areas adjacent to all the black image areas, but such discrimination requires a relatively long time and is burdensome for the recording operation designed for a high-speed recording process. The present embodiment is to achieve a process of a higher speed, by applying similar discrimination only on the character codes in the black image areas as shown in FIG. 22.

Figure 22:
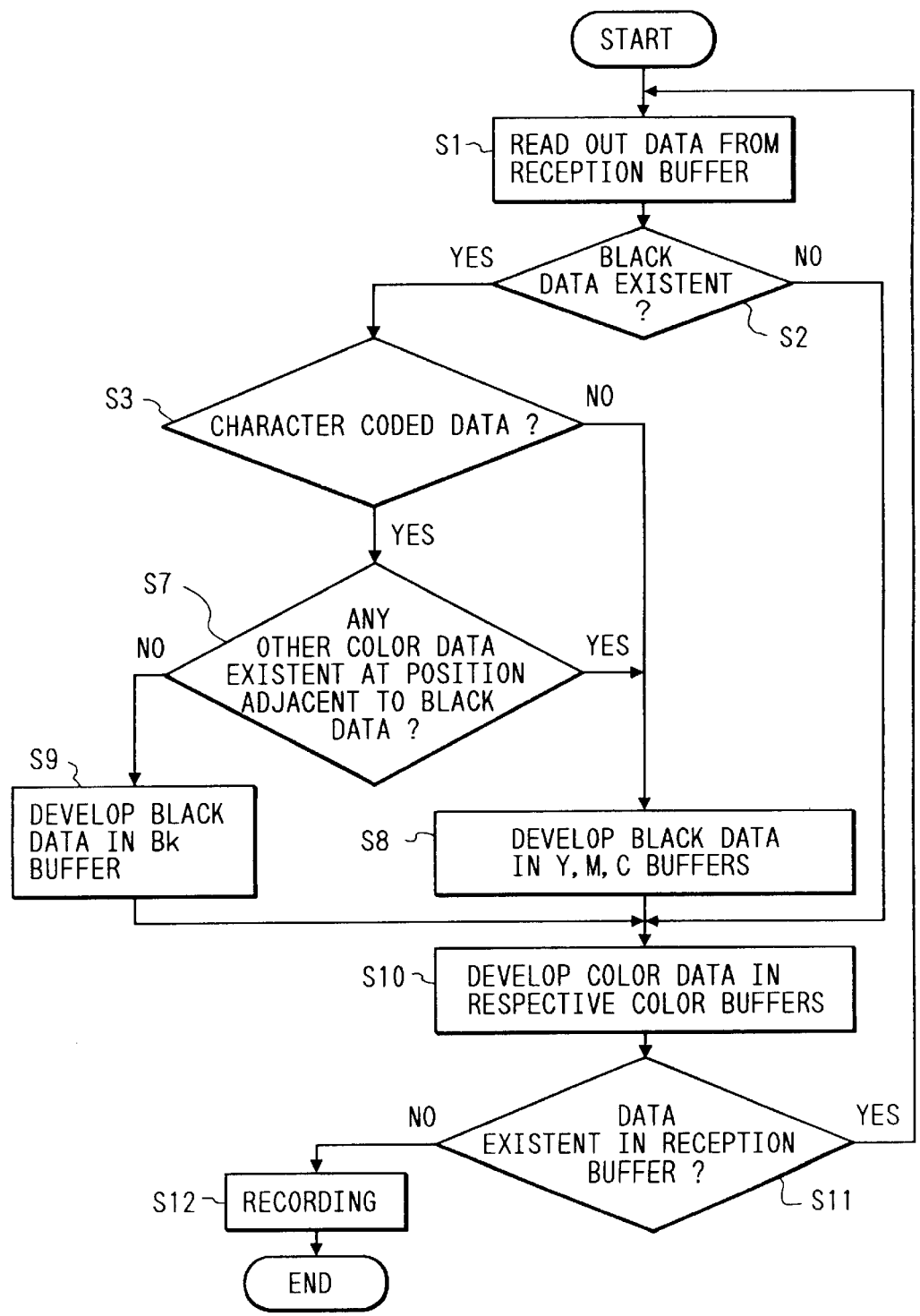
FIG. 22 is a flow chart showing another function of the embodiments.

In comparison with the flow chart of the embodiment 6 shown in FIG. 21, the flow chart shown in FIG. 22 additionally contains a step S3. Because of said step S3, a black image area consisting of character codes is processed in the same manner as in FIG. 21, but other black image areas, consisting for example of bit image data, are developed in the C, M and Y data buffers for color recording, in a step S8.

Such process provides an advantage of maintaining black characters at high print quality.

Embodiment 8

In the step S7 of the embodiment 6, shown in FIG. 21, the adjacent position to the periphery of the black image area is defined as "upper and/or lower and/or left and/or right" to each pixel constituting the black image. This definition is an example designed for a range not exceeding the pitch P of the pixels, but should be selected wider for certain inks or recording medium to be employed.

Experiments were conducted for printing on the plain paper of various grades with the inks of the embodiment 6. At first the surrounding area X·P of the black image areas was defined by $X=\sqrt{2}$ wherein P is the pixel recording pitch, thereby considering "upper and/or lower and/or left and/or right and/or upper right and/or upper left and/or lower right and/or lower left" positions with respect to the object black pixel. Then, also considered were the cases of X=2 and $X=2\sqrt{2}$. In this manner, the effect of the present invention was satisfactorily obtained on the plain paper of most grades, by the consideration within a range of $X=4\sqrt{2}$.

Based on the above-mentioned results, in the present embodiment, there is considered the presence of at least a color recording pixel constituting a color image area in an adjacent position to the periphery of an object black image area, wherein said adjacent position is defined by X-P in which P is the minimum pixel recording pitch, and a range $4\sqrt{2} \geq X \geq 1$ is effective for the present embodiment.

Embodiment 9

The embodiment 6 utilizes a frame buffer capable of recording the data of a page, but the present invention is effective also in case a line buffer is employed instead.

In the step S7 in FIG. 21, the adjacent position to the periphery of the black image area is defined by "upper and/or lower and/or left and/or right" position adjacent to each pixel constituting a black image area, but this definition is replaced by a definition that the periphery of a black image area is not adjacent to other colors in the effective recording range of said line buffer.

Embodiment 10

FIG. 23A is a schematic view of another recording apparatus in which the color ink jet recording method of the present invention is applicable, wherein provided are a yellow ink recording head 1y; a magenta ink recording head 1m; a cyan ink recording head 1c; a black ink recording head 1k; a carriage 2 supporting said recording heads; a flexible cable 3 for sending electrical signals to the recording heads from the main body of the apparatus; a capping unit 4 provided with recovery means; capping members 5y, 5m, 5c, 5k respectively corresponding to the recording heads 1y, 1m, 1c, 1k; a wiper blade 6 composed for example of rubber; and a recording paper 7 supported in opposed relation to the recording heads.

FIG. 23B illustrates one of the four recording heads mounted on said recording apparatus. In a portion opposed to the recording paper, there are formed 64 discharge openings 10, with a density of 360 dpi. Said discharge openings 10 respectively communicate with liquid paths, behind which there is provided a common liquid chamber for supplying said liquid paths with ink. In the liquid paths respectively corresponding to the discharge openings, there are provided electrothermal converters for generating thermal energy for emitting ink droplets from said discharge openings, and wirings for supplying said converters with an electric power.

The present embodiment can achieve black recording of high quality and color recording of high quality in compatible manner, by recording a black image area with a high density and with reduced feathering in case of an independent black image area not in contact with a color image area, and avoiding ink blotting between the black color and other colors in other image areas.

Embodiment 11–18

At first there will be explained the outline of these embodiments.

In the course of investigation for achieving a color recording with high black character quality and without bleeding on the plain paper, the present inventors have found that high quality black recording and high quality color recording are rendered compatible by selecting the blotting rate of the black ink smaller than that of the color inks, and also by discriminating whether a color image area is present adjacent to the black image area and forming said black image area either by the black ink or by the plural color inks according to the result of said discrimination.

In order to prevent bleeding between the inks, it is necessary to increase the wetting property of the ink to the recording paper, thereby increasing the blotting rate. However an excessively large blotting rate leads to an irregular shape of the recorded dot, thus deteriorating particularly the print quality of the characters. It is however possible to improve the print quality of black characters, by selecting the blotting rate of the black ink lower than that of other color inks.

Also since the color inks of a high blotting rate are fixed faster, the black ink flows into the fixed area of the color inks in case the black ink and the color inks are in mutual contact, thereby causing bleeding phenomenon between the black and color images. Such flow of the black ink can be prevented by forming the black image with plural color inks when a color image area is present adjacent to the black image area. On the other hand, if such adjacent color image is absent, the black image area is formed with the black ink, thereby providing black characters of high quality.

In the present invention, the blotting rate is regulated by the addition of a surfactant and a penetrating solvent to the ink.

Examples of said surfactant include anionic surfactants such as fatty acid salts, sulfate esters of higher alcohols, alkyl benzene sulfonate salts and phosphate esters of higher alcohols; cationic surfactants such as aliphatic amine salts and quaternary ammonium salts; nonionic surfactants such as ethylene oxide adducts of higher alcohols, ethylene oxide adducts of alkyl phenols, aliphatic ethylene oxide adducts, ethylene oxide adducts of polyvalent alcohol-fatty acid esters, ethylene oxide adducts of higher alkylamines, ethylene oxide adducts of fatty acid amides, ethylene oxide adducts of polypropylene glycol, fatty acid esters of polyhydric alcohols, and fatty acid amides of alkanol amines; and amphoteric surfactants or amino acid type and betain type. Though not limitative, there is preferably employed a nonionic surfactant such as an ethylene oxide adduct of higher alcohol, an ethylene oxide adduct of alkylphenol, ethylene oxide-propylene oxide copolymer, or an ethylene oxide adduct of acetylene glycol. The amount of addition of ethylene oxide in said adducts is preferably in a range of 4 to 20 moles.

The amount of addition of such surfactant is not limited, but is preferably within a range of 0.01 to 10%, since an amount less than 0.01% does not provide, in general, a sufficient increase in the blotting rate, while an amount exceeding 10% increases the initial viscosity of the ink.

Additional preferred examples of the solvent furnishing the penetrability include ethers such as tetrahydrofurane or dioxane; lower alkyl ethers of polyhydric alcohols such as ethyleneglycol methyl ether, diethyleneglycol monomethyl ether, or triethyleneglycol monomethyl ether; ethanol and isopropyl alcohol.

The amount of addition of such solvent is not limited, but is preferably within a range of 0.1 to 20%, since an amount less than 0.1% does not provide, in general, a sufficient increase in the blotting rate, while an amount exceeding 20% somewhat reduces the solubility of the coloring materials.

In the recording inks, there can be used most of the water-soluble acid dyes, direct dyes, basic dyes and reactive dyes contained in the Color Index. Also those not listed in the Color Index may be used if they are water-soluble. The amount of such dye is not particularly limited, but is preferably employed in an amount of 0.1 to 20 wt. % with respect to the total ink weight.

Such recording inks usually contain water and water-soluble organic solvent, in addition to the additives mentioned above. Examples of such water-soluble organic solvent include amides such as dimethylformamide or dimethylacetamide; ketones such as acetone; polyalkylene glycols such as polyethylene glycol or polypropylene glycol; alkylene glycols such as ethylene glycol, propylene glycol, butylene glycol, triethylene glycol, 1,2,6-hexanetriol, thiodiglycol, hexylene glycol or diethylene glycol; lower alkyl ethers of polyhydric alcohols such as ethylene glycol monomethylether, diethylene glycol monomethylether or triethylene glycol monomethylether; monohydric alcohols such as methanol or isopropyl alcohol; glycerine, N-methyl-2-pyrrolidone, 1,3-dimethyl-2-imidazolidine, triethanolamine, sulfolane and dimethylsulfoxide. The amount of said water-soluble organic solvent: is not particularly limited, but is preferably employed within a range of 1 to 80 wt. %.

In addition, the recording ink may further contain, if necessary, other additives such as a viscosity regulator, a pH regulator, an antiseptic, an antioxidant and an evaporation accelerator.

The amount of discharge per drop of the ink employed in the present invention is, though somewhat dependent on the recording density, preferably within a range of 10 to 300 pl for the black ink, and 5–100 pl for the color inks. An amount less than 10 pl for the black ink or 5 pl for the color ink cannot provide a sufficient print density, while an amount exceeding 300 pl for the black ink or 100 pl for the color ink may exceed the absorbing capacity of the recording paper.

In the present embodiments, which are characterized in that the blotting rate of the black inks is smaller than that of the color inks, the blotting rate is preferably within the following ranges:

Blotting rate of black ink: 1.2–2.5
Blotting rate of color inks: 1.8–3.5

Black ink with a blotting rate less than 1.2 shows a limited spreading of the ink droplet, and has to be deposited with a larger amount in recording a solid black image, thus eventually exceeding the absorbing capacity of the recording paper. On the other hand, black ink with a blotting rate exceeding 2.5 shows excessive spreading of the ink droplet, thus losing the edge sharpness of the recorded dot and deteriorating the print quality.

Also, color ink with a blotting rate less than 1.8 enhances the bleeding phenomenon between different colors, while color ink with a blotting rate exceeding 3.5 shows a reduced density because of the excessive spreading of the ink droplet.

The blotting rate is regulated by the amount of the surfactant and the penetrating solvent, but it can also be regulated, if necessary, by the amount of solvent or by the adjustment of physical properties such as surface tension or viscosity.

In the following, the recording method of the present embodiments will be explained in detail, with reference to the attached drawings. The recording apparatus and the recording head to be employed in the present embodiments are the same as those already explained with reference to FIGS. 6 to 8. Also the control sequences in the present embodiments are the same as those in embodiments 6 to 10, explained in relation to FIGS. 21 to 24, and will not, therefore, be explained further.

In the following description of the embodiments and reference examples, the amounts are shown by parts or per cent by weight unless otherwise specified.

The recording inks (1)–(10) were obtained by dissolving the following components under agitation, and filtering the obtained solution under pressure with a membrane filter of a pore size of 0.22 μm (Fluoropore Filter, a trade name of Sumitomo Denko Co., Ltd.).

(1)
Yellow

| | |
|---|---|
| C.I. direct yellow 86 | 2 parts |
| Ethylene oxide adduct of lauryl alcohol (10 moles added) | 0.5 parts |
| Diethylene glycol | 30 parts |
| Water | 67.5 parts |

Magenta

| | |
|---|---|
| C.I. acid red 35 | 3 parts |
| Ethylene oxide adduct of lauryl alcohol (10 moles added) | 0.5 parts |
| Diethylene glycol | 30 parts |
| Water | 66.5 parts |

Cyan

| | |
|---|---|
| C.I. direct blue 199 | 2 parts |
| Ethylene oxide adduct of lauryl alcohol (10 moles added) | 0.5 parts |
| Diethylene glycol | 30 parts |
| Water | 67.5 parts |

Black

| | |
|---|---|
| C.I. food black 2 | 2 parts |
| Diethylene glycol | 10 parts |
| Water | 88 parts |

(2)
Yellow

| | |
|---|---|
| C.I. direct yellow 86 | 2 parts |
| Ethylene oxide adduct of nonyl alcohol (18 moles added) | 5 parts |
| Diethylene glycol | 15 parts |
| Water | 78 parts |

Magenta

| | |
|---|---|
| C.I. acid red 35 | 3 parts |
| Ethylene oxide adduct of nonyl alcohol (18 moles added) | 5 parts |
| Diethylene glycol | 15 parts |
| Water | 77 parts |

Cyan

| | |
|---|---|
| C.I. direct blue 199 | 2 parts |
| Ethylene oxide adduct of nonyl alcohol | 5 parts |

(18 moles added)
Diethylene glycol 15 parts
Water 78 parts
Black

C.I. food black 2 2 parts
Diethylene glycol 10 parts
Water 88 parts
(3)
Yellow

C.I. direct yellow 86 2 parts
Ethylene oxide-propylene oxide copolymer 3 parts
(7 moles added)
Thiodiglycol 20 parts
Water 75 parts
Magenta C.I. acid red 35 3 parts
Ethylene oxide-propylene oxide copolymer 3 parts
(7 moles added)
Thiodiglycol 20 parts
Water 74 parts
Cyan C.I. direct blue 199 2 parts
Ethylene oxide-propylene oxide copolymer 3 parts
(7 moles added)
Thiodiglycol 20 parts
Water 75 parts
Black C.I. food black 2 2 parts
Thiodiglycol 15 parts
Water 83 parts
(4)
Yellow C.I. direct yellow 86 2 parts
Ethylene oxide adduct of acetylene glycol 1 part
(10 moles added)
Thiodiglycol 10 parts
Glycerine 10 parts
Water 77 parts
Magenta C.I. acid red 35 3 parts
Ethylene oxide adduct of acetylene glycol 1 part
(10 moles added)
Thiodiglycol 10 parts
Glycerine 10 parts
Water 76 parts
Cyan C.I. direct blue 199 2 parts
Ethylene oxide adduct of acetylene glycol 1 part
(10 moles added)
Thiodiglycol 10 parts
Glycerine 10 parts
Water 65 parts
Black C.I. food black 2 3 parts
Thiodiglycol 5 parts
Glycerine 5 parts
Urea 5 parts
Isopropyl alcohol 3 parts
Water 79 parts
(5)
Yellow C.I. direct yellow 86 2 parts
Decaglycerine monolaurate 15 parts
Diethylene glycol 30 parts
Water 50.2 parts
Magenta
C.I. acid red 2 parts
Decaglycerine monolaurate 15 parts
Diethylene glycol 30 parts
Water 50.2 parts
Cyan C.I. direct blue 199 2 parts
Decaglycerine monolaurate 15 parts
Diethylene glycol 30 parts
Water 50.2 parts
Black C.I. food black 2 2 parts
Decaglycerine monolaurate 0.2 parts
Diethylene glycol 12 parts
Water 85.8 parts
(6)
Yellow C.I. direct yellow 86 2 parts
Sodium lauryl sulfate 0.2 parts
Diethylene glycol 15 parts
Water 82.8 parts
Magenta C.I. acid red 2 parts
Sodium lauryl sulfate 0.2 parts
Diethylene glycol 15 parts
Water 82.8 parts
Cyan C.I. direct blue 199 2 parts
Sodium lauryl sulfate 0.2 parts
Diethylene glycol 15 parts
Water 82.8 parts
Black C.I. food black 2 2 parts
Diethylene glycol 15 parts
Cyclohexanol 0.1 parts
Water 82.9 parts
(7)
Yellow C.I. direct yellow 86 2 parts
Ethylene glycol methylether 15 parts
Diethylene glycol 15 parts
Water 68 parts
Magenta C.I. acid red 2 parts
Ethylene glycol methylether 15 parts
Diethylene glycol 15 parts
Water 82.8 parts
Cyan C.I. direct blue 199 2 parts
Ethylene glycol methylether 15 parts
Diethylene glycol 15 parts
Water 82.8 parts
Black C.I. food black 2 2 parts
Diethylene glycol 15 parts
Cyclohexanol 0.1 parts
Water 82.9 parts
(8)
Yellow C.I. direct yellow 86 2 parts
Isopropyl alcohol 15 parts
Diethylene glycol 15 parts
Water 68 parts
Magenta C.I. acid red 2 parts
Isopropyl alcohol 15 parts
Diethylene glycol 15 parts
Water 82.8 parts
Cyan C.I. direct blue 199 2 parts
Isopropyl alcohol 15 parts
Diethylene glycol 15 parts -continued

| | |
|---|---|
| Water | 82.8 parts |
| Black | |
| C.I. food black 2 | 2 parts |
| Diethylene glycol | 15 parts |
| Cyclohexanol | 1 part |
| Water | 82 parts |
| (9) Reference example | |
| Yellow | |
| C.I. direct yellow 86 | 2 parts |
| Diethylene glycol | 15 parts |
| Water | 83 parts |
| Magenta | |
| C.I. acid red | 2 parts |
| Diethylene glycol | 15 parts |
| Water | 83 parts |
| Cyan | |
| C.I. direct blue 199 | 2 parts |
| Diethylene glycol | 15 parts |
| Water | 83 parts |
| Black | |
| C.I. food black 2 | 2 parts |
| Diethylene glycol | 15 parts |
| Ethylene oxide-propylene oxide copolymer (7 moles added) | 3 parts |
| Water | 80 parts |
| (10) | |
| Yellow | |
| C.I. direct yellow 86 | 2 parts |
| Diethylene glycol | 5 parts |
| Cyclohexanol | 0.1 parts |
| Water | 92.9 parts |
| Magenta | |
| C.I. acid red | 2 parts |
| Cyclohexanol | 0.1 parts |
| Diethylene glycol | 5 parts |
| Water | 92.9 parts |
| Cyan | |
| C.I. direct blue 199 | 2 parts |
| Cyclohexanol | 0.1 parts |
| Diethylene glycol | 5 parts |
| Water | 92.9 parts |
| Black | |
| C.I. food black 2 | 2 parts |
| Diethylene glycol | 35 parts |
| Cyclohexanol | 3 parts |
| Water | 60 parts |

The above-mentioned inks (1) to (10) were used in the recording operations on quality paper, commercially available copying paper and bond paper, with the recording apparatus shown in FIG. 6 and the recording head shown in FIGS. 7A and 7B, according to the operation sequence shown in FIG. 21, in which the black image adjacent to a color image is recorded with the yellow, magenta and cyan inks, while the independent black image is recorded with the black ink.

FIG. 24 shows the dot diameters of the black and color inks on the obtained records, and the blotting rates determined from the dot diameters.

The recorded dot on the quality paper was observed with a CCD camera and was subjected to the calculation of dot area by image processing, and said area was converted into the diameter of a true circle. Thus obtained diameter was taken as B in the equation I.

Also the diameter of ink droplet (C in the equation I) was determined from the following equation:

$$V = (4/3)\pi (C/2) \times 10^{-3}$$

wherein V is the liquid volume (pl) discharged per pulse.

Also, FIG. 25 shows the fixing times of the black and color inks in the obtained records. Said fixing time was measured by solid printing (100% duty) on the commercially available quality paper with the yellow, magenta, magenta and black inks, then rubbing the printed area with filter paper (Toyo Filter Paper Co., Ltd., No. 5C) at intervals of 5 seconds after the printing, and determining a time at which the smear by rubbing no longer takes place.

Method and Criteria of evaluation (1) Bleeding

A color sample in which different colors are mutually adjacent was printed, and the state of bleeding was observed and evaluated in the following manner. Used for this evaluation were seven colors, namely black, yellow, magenta, cyan, and red, green and blue obtained by superposing two of said yellow, magenta and cyan, but the evaluation was divided into the bleeding between black and one of yellow, magenta, cyan, red, green and blue, and the bleeding between said colors:

O: No bleeding observed at the boundary between colors;

Δ: Bleeding at the boundary between colors is observable but within the practically tolerable level;

X: Bleeding is conspicuous and practically not acceptable.

(2) Black Character Quality

Black alphanumerical characters were recorded so as not to be adjacent to a color image, and, after standing for one hour, the record was observed under a microscope for irregular blotting and edge sharpness, according to the following criteria:

O: Character edges are sharp, without irregular blotting;

Δ: Irregular blotting is observable but within a practically acceptable range;

X: Character edges are unsharp, with irregular blotting, and are practically unacceptable.

The results of these evaluations are shown in FIG. 26.

As explained in the foregoing, the present invention renders black recording of high quality and color recording of high quality compatible, by recording a black image area with a high record density, thereby improving the print quality in the case where said black image area is independent without contact with a color image area, and avoiding ink blotting between the black and other colors or among said other colors in other image areas.

Among various ink jet recording methods, the present invention brings about a particular effect when applied to a recording head provided with means for generating thermal energy (such as electrothermal converter or a laser beam) to be utilized for causing ink discharge and inducing a state change in the ink by said thermal energy, and a recording apparatus employing such recording head, because such method can provide a higher density or a higher definition in the record.

The principle and representative configuration of such system are disclosed, for example, in U.S. Pat. Nos. 4,723, 129 and 4,740,796. This system is applicable to so-called on-demand recording or continuous recording, but is particularly effective in on-demand recording because, in response to the application of at least a drive signal representing the recording information to an electrothermal converter element positioned corresponding to a liquid channel or a sheet containing liquid (ink) therein, said element generates thermal energy capable of causing a rapid temperature increase exceeding the nucleus boiling point, thereby inducing film boiling on a heat action surface of the recording head and thus forming a bubble in said liquid (ink), in one-to-one correspondence with said drive signal. Said liquid (ink) is discharged through a discharge opening by the growth and contraction of said bubble, thereby forming at least a liquid droplet. Said drive signal is preferably formed as a pulse, as it realizes instantaneous growth and contraction of the bubble, thereby attaining highly responsive discharge of the liquid (ink). Such pulse-shaped drive signal is preferably that disclosed in U.S. Pat. Nos. 4,463,359 and 4,345,262. Also the conditions described in U.S. Pat. No. 4,313,124 relative to the temperature increase rate of said heat action surface allows further improved recording.

The configuration of the recording head is determined by the combinations of the liquid discharge openings, liquid channels and electrothermal converter elements with linear or rectangular liquid channels, disclosed in the above-mentioned patents, but a configuration disclosed in U.S. Pat. No. 4,558,333 in which the head action part is positioned in a flexed area, and a configuration disclosed in U.S. Pat. No. 4,459,600 also belong to the present invention. Furthermore, the present invention is effective in a structure disclosed in Japanese Patent Laid-open Application No. 59-123670, having a slit common to plural electrothermal converter elements as a discharge opening therefor, or in a structure disclosed in Japanese Pat. Laid-open Application No. 59-138461, having an aperture for absorbing the pressure wave of thermal energy, in correspondence with each discharge opening. Stated differently, the present invention can achieve recording in a securer and more efficient manner, regardless of the configuration of the recording head.

Furthermore, the ink jet recording apparatus of the present invention is usable not only as an image output terminal for information processing equipment such as a computer, but also may be in the form of a copying machine in combination with an image reader, or a facsimile apparatus with transmitting receiving functions.

What is claimed is:

1. A color image forming method for forming a color image on a recording medium, comprising the steps of:

forming an image with a black liquid having a diffusibility greater than a diffusibility of a color liquid with respect to the recording medium, wherein said color liquid is different in color from said black liquid; and forming an image with said color liquid with a penetrability greater than the penetrability of said black liquid with respect to the recording medium, wherein said black liquid contains urea, and said color liquid contains acetylene glycol-EO adduct.

2. A color image forming method according to claim 1, wherein said acetylene glycol-EO adduct constitutes at least 3% by weight of said color liquid.

3. A color image forming method for forming a color image on a recording medium, comprising the steps of:

forming an image with a black liquid having a surface tension that is greater than a surface tension of a color liquid, wherein said color liquid is different in color from said black liquid; and forming an image with said color liquid, wherein said black liquid contains urea, and said color liquid contains acetylene glycol-EO adduct.

4. A color image forming method for forming a color image on a recording medium, comprising the steps of:

forming a first image by depositing on said recording medium a black liquid having a surface tension that is greater than a surface tension of plural color liquids, wherein said plural color liquids are different in color from said black liquid; and forming a second image by depositing on said recording medium said plural color liquids, said second image having a boundary with said first image, wherein an image of a predetermined width of pixels of a black image adjacent to the boundary between the first image and the second image is formed by pixels of the black liquid and pixels of plural color liquids.

5. A color image forming method according to claim 4, wherein the image of said black image adjacent to the boundary is formed including said black liquid.

6. A color image recording apparatus comprising:

liquid jet recording means for discharging a black liquid and color liquids of plural colors, wherein said color liquids are different in color from said black liquid, onto a recording medium; and means for supplying said recording means with recording signals;

wherein said recording signal supplying means supplies said recording means with a signal for causing discharge of said black liquid alone in a character area of black color only, wherein said black liquid has a diffusibility that is greater than a diffusibility of said color liquids which are different in color from said black liquid with respect to the recording medium, a signal for causing discharge of one of said color liquids, which has a penetrability that is greater than a penetrability of said black liquid with respect to the recording medium, in an independent color area different in color from said black liquid, a signal for causing discharge of said color liquids, in a black color area at a boundary between said black liquid and said color liquid, and a signal for causing discharge of said black liquid in said black color area at the boundary.

7. A color image recording apparatus comprising:

liquid jet recording means for discharging liquids of different colors onto a recording medium; and means for supplying said recording means with recording signals;

wherein said recording signal supplying means supplies said recording means with a signal for causing discharge of a black liquid which has a surface tension and a diffusibility that are greater than a surface tension and a diffusibility of a color liquid, wherein said color liquid is different in color from said black liquid, alone in a character area of black color only; a signal for causing discharge of said color liquid having greater penetrability than a penetrability of said black liquid with respect to the recording medium, in an independent color area which is different in color from said black liquid; and a signal for causing discharge of plural color liquids which are different in color from said black liquid, in a black color area at a boundary between said black liquid and said color liquid.

8. A recording apparatus according to claim 7, wherein said recording signal supplying means supplies said recording means with a signal for causing discharge of said black liquid in said black color area at the boundary.

9. A color image forming method for forming a color image on a recording medium, comprising the steps of:

forming an image with a first color liquid which has a penetration time, from deposition onto the recording medium to an abrupt change in amount of surface reflected light, on an order of 100 msec;

forming an image with a second color liquid which has a luminosity lower than a luminosity of said first color liquid and which has a penetration time on the order of a second, and said first color liquid has cyan, magenta or yellow color, and said second color liquid has black color; and forming a deposition area by depositing on the recording medium only the color liquid, which is different in color from the black liquid, in at least a part of a boundary of the deposition area formed with said black liquid only.

10. A color image forming method for forming a color image on a recording medium, comprising the steps of:

depositing only a black liquid on said recording medium to cover a portion of the recording medium with said black liquid and thereby form a first deposition area having a boundary; and depositing on said recording medium a color liquid which is different in color from said black liquid, to cover a portion of the recording medium with said color liquid and thereby form a second deposition area in at least a part of said boundary of said first deposition area.

11. A color image recording apparatus comprising:

ink jet recording means provided with plural adjacent color ink discharge units arranged at a predetermined pitch in a scanning direction, wherein the adjacent discharge units have a recording interval on an order of 10 msec; and means for forming deposition areas, having boundaries, said deposition areas being portions of the recording medium which are covered by a color liquid, by depositing on a recording medium droplets of a first color liquid which has cyan, magenta or yellow color, and which has a penetration time from deposition onto the recording medium to an abrupt change in amount of surface reflected light on an order of 100 msec and droplets of a second color liquid which is a black liquid and has a luminosity lower than a luminosity of said first color liquid and which has a penetration time on the order of a second, and forming a deposition area by depositing on the recording medium only the color liquid, which is different in color from the black liquid, in at least a part of the boundary of the deposition area formed with said black liquid only.

12. A color ink jet recording method forming a color image on a recording medium, using a black ink and color inks of plural colors different from said black ink, comprising the steps of:

discriminating whether a color image is present adjacent to a black image having a periphery;

determining whether said black image is formed with said black ink or with said color inks of plural colors based on said discrimination;

forming said black image according to said determination; and forming a black image of a predetermined width of pixels adjacent to a boundary between the black image and the color image, by pixels of said black ink and pixels of one or more of said color inks;

wherein, when an image of a predetermined width of pixels of the black image adjacent to the boundary between the black image and the color image is to be formed by pixels of color inks, the image is formed by dots of predetermined one of the colors and dots of at least two colors.

13. A color ink jet recording method according to claim 12, wherein said black image is formed with said black ink when the periphery of said black image is not adjacent to said color image, but said black image is formed with said color inks of plural colors when at least a part of the periphery of said black image is adjacent to said color image.

14. A color ink jet recording method according to claim 12, wherein said black image is formed with said black ink when a periphery of said black image is not adjacent to said color image or when at least a part of said periphery is adjacent to said color image, but said black image is formed with said color inks of plural colors when an entire periphery of said black image is adjacent to said color image.

15. A color ink jet recording method according to claim 12, wherein a part of said black image is formed with the black ink and another part of said black image is formed with said color inks of plural colors when at least a part of the periphery of said black image is adjacent to said color image.

16. A color ink jet recording method according to claim 12, wherein said color inks of plural colors are of yellow, magenta and cyan colors.

17. A color ink jet recording apparatus comprising:

a black ink recording head for discharging black ink;

plural color ink recording heads, for discharging color inks of plural colors, each different in color from said black ink;

means for supplying said black ink recording head and said color ink recording heads with recording signals; and discrimination means for discriminating whether a black image is adjacent to a color image;

wherein said supply means determines, for said black image, whether to supply a recording signal for discharging the black ink to said black ink recording head, or to supply recording signals for discharging the color inks to said color ink recording heads, based on discrimination by said discrimination means; and wherein there is a boundary between the black image and the color image, and when an image of a predetermined width of pixels of a black image area adjacent to said boundary is to be formed by pixels of color inks, the image is formed by dots of predetermined one of the colors and dots of at least two colors.

18. An apparatus according to claim 17, further comprising a buffer for storing black image data for forming said black image, a buffer for the black ink, and buffers for the color inks of plural colors, wherein said black image data comprises character code data and bit image data, and said character code data are stored in said buffer for the black ink, while said bit image data are stored in said buffers for the color inks of plural colors.

19. An apparatus according to claim 18, wherein said supply means, when said apparatus is printing character code data, supplies said black ink recording head with a recording signal for discharging the black ink, when data for another color are absent, in said buffers for color inks, in pixels the same as or adjacent to a print position of said character code data, but supplies the color ink recording heads with recording signals for discharging the color inks when such data are present.

20. An apparatus according to claim 18, wherein said supply means, when printing said bit image data, supplies said color ink recording heads with recording signals for discharging color inks when the data stored in the buffers for the color inks of plural colors are mutually different among different colors, but supplies said black ink recording head with a recording signal for discharging the black ink when said data are mutually equal.

21. An apparatus according to claim 17, wherein said color inks of plural colors are of yellow, magenta and cyan colors.

22. A color ink jet recording method for forming a color image on a recording medium by discharging inks thereon, comprising the steps of:

forming an image with a black ink;

forming an image with color inks of plural colors, each different from said black ink;

discriminating whether a color image area is present adjacent to a black image having a periphery; and determining whether said black image is formed by depositing said black ink, or by depositing said color inks of plural colors on said recording medium, based on said discrimination, wherein said black image is formed by depositing said black ink when said black image is not adjacent to a color image, and said black image is formed by depositing the color inks of said plural colors when at least a part of the periphery of said black image is adjacent to the color image;

wherein the periphery of said black image is adjacent to the color image, when at least a color recording pixel, constituting the color image, is present in a recording position within X·P ($4\sqrt{2} \geq X \geq 1$), with respect to at least a black recording pixel constituting the black image on the recording medium, wherein P is the minimum pixel pitch in recording; and wherein said black ink has a penetration speed into said recording medium lower than the penetration speed into said recording medium of the color inks of said plural colors.

23. A color ink jet recording method according to claim 22, wherein X=1.

24. A color ink jet recording method according to claim 22, wherein X=$\sqrt{2}$.

25. A color ink jet recording method according to claim 22, wherein X=2.

26. A color ink jet recording method according to claim 22, wherein X=$2\sqrt{2}$.

27. A color ink jet recording method according to claim 22, wherein said discriminating step is applied only to the black image stored in a memory, and other black images are formed by depositing the color inks of said plural colors on said recording medium.

28. A color ink jet recording method according to claim 22, wherein said color inks of plural colors are of yellow, magenta and cyan colors or of green, red and blue colors.

29. A color ink jet recording method according to claim 22, wherein said inks are discharged by thermal energy.

30. A color image formed on a recording medium formed by the recording method according to claim 22.

31. A color ink jet recording method for forming a desired color image on a recording medium by discharging inks thereon, comprising the steps of:

forming an image with a black ink;

forming an image with color inks of plural colors, different from said black ink;

discriminating whether a color image is present adjacent to a black image having a periphery; and determining whether said black image is formed with said black ink or with said color inks of plural colors, based on said discrimination;

wherein said black ink and said color inks each have a blotting rate, represented by the formula $$A = B/C$$

wherein

A=blotting rate;

B=diameter ($\mu$m) of a single dot formed on quality paper; and

C=diameter ($\mu$m) of a discharged single ink droplet, wherein the blotting rate of said black ink is smaller than the blotting rates of said color inks;

wherein said black image is formed by depositing said black ink on said recording medium when the periphery of said black image is not adjacent to a color image area, and a black image area is formed with the color inks of said plural colors when at least a part of the periphery of said black image is adjacent to said color image area; and wherein the periphery of said black image is discriminated to be adjacent to a color image when at least a color recording pixel, constituting said color image, is present in a position within a range X·P ($4\sqrt{2} \geq X \geq 1$) with respect to at least a black recording pixel constituting the black image on the recording medium, wherein P is the minimum pixel recording pitch.

32. A color ink jet recording method according to claim 31, wherein X=1.

33. A color ink jet recording method according to claim 31, wherein X=$\sqrt{2}$.

34. A color ink jet recording method according to claim 31, wherein X=2.

35. A color ink jet recording method according to claim 31, wherein X=$2\sqrt{2}$.

36. A color ink jet recording method according to claim 31, wherein the blotting rate is within a range of 1.2 to 2.5 for the black ink and within a range of 1.8 to 3.5 for the color inks.

37. A color ink jet recording method according to claim 36, wherein said black ink or said color inks contain at least one of a surfactant and a penetrating solvent.

38. A color ink jet recording method according to claim 37, wherein the surfactant added to said black ink or said color inks is an ionic surfactant, a nonionic surfactant, an amphoteric surfactant or a mixture of at least two thereof.

39. A color ink jet recording method according to claim 38, wherein the surfactant added to said black ink or said color inks is a nonionic surfactant.

40. A color ink jet recording method according to claim 39, wherein the surfactant added to said black ink or said color inks is at least one selected from the group consisting of ethylene oxide adducts of higher alcohols, ethylene oxide adducts of alkyl-phenols, ethylene oxide-propylene oxide copolymer, and ethylene oxide adducts of acetylene glycol.

41. A color ink jet recording method according to claim 37, wherein the penetrating solvent added to said black ink or said color inks is at least one compound selected from the group consisting of ethers, lower alkyl ethers of polyhydric alcohols, and monohydric alcohols.

42. A color ink jet recording method according to claim 31, wherein said discriminating step is applied only to the black image stored in a memory, and other black image images are formed by depositing the color inks of said plural colors on said recording medium.

43. A color ink jet recording method according to claim 31, wherein said color inks of plural colors are of yellow, magenta and cyan colors or of green, red arid blue colors.

44. A color ink jet recording method according to claim 31, wherein said black ink has a fixing time longer than fixing times for said color inks.

45. A color ink jet recording method for forming a color image on a recording medium by discharging inks thereon, comprising the steps of:

forming an image with a black ink in accordance with black image data comprising character code data and bit image data; and forming an image with color inks of plural colors, each different from said black ink;

wherein said black ink has a penetration speed into said recording medium lower than a penetration speed into said recording medium of said color inks of plural colors, wherein a discriminating step, which discriminates whether a color image is present adjacent to a black image, is applied only to the black image resulting from bit image data formed by depositing said color inks of plural colors on said recording medium.

46. A color ink jet recording method for forming a desired color image on a recording medium by discharging inks thereon, comprising the steps of:

forming an image with a black ink in accordance with black image data comprising character code data and bit image data; and forming an image with color inks of plural colors, different from said black ink;

wherein said black ink and said color inks each have a blotting rate, represented by the formula $$A=B/C$$

wherein

A=blotting rate;

B=diameter ($\mu$m) of a single dot formed on quality paper; and

C=diameter ($\mu$m) of a discharged single ink droplet, wherein the blotting rate of said black ink is smaller than the blotting rates of said color inks; and wherein said discriminating step is applied only to a black image resulting from bit image data formed by depositing said color inks of plural colors on said recording medium.

47. A color ink jet recording method according to any of claims 31 or 32 to 41, wherein said inks are discharged by thermal energy.

48. A color ink jet recording method forming a color image on a recording medium, using a black ink and color inks of plural colors different from said black ink, comprising the steps of:

discriminating whether a color image is present adjacent to a black image having a periphery;

determining whether said black image is formed with said black ink or with said color inks of plural colors based on said discrimination;

forming said black image according to said determination; and forming a black image of a predetermined width of pixels adjacent to a boundary between the black image and the color image, by pixels of said black ink and pixels of one or more of said color inks.

* * * * *

UNITED STATES PATENT AND TRADEMARK OFFICE
CERTIFICATE OF CORRECTION

PATENT NO.   : 6,007,182
DATED        : December 28, 1999
INVENTOR(S)  : Miyuki Matsubara, et al.

It is certified that error appears in the above-identified patent and that said Letters Patent is hereby corrected as shown below:

Title page,

Item [56] References Cited - U.S. PATENT DOCUMENTS

After "5,477,248  12/1995  Sugimoto et al. . . . . . . . . . .347/43" insert

| -- 4,313,124 | 1/1982  | Hara . . . . . . . . . . . . . . . . . . . | 346/140 R |
|    4,345,262 | 8/1982  | Shirato et al. . . . . . . . . . . . . | 346/140 R |
|    4,459,600 | 7/1984  | Sato et al. . . . . . . . . . . . . . . | 346/140 R |
|    4,463,359 | 7/1984  | Ayata et al. . . . . . . . . . . . . . | 346/1.1 |
|    4,558,333 | 12/1985 | Sugitani et al. . . . . . . . . . . . | 346/140 R |
|    4,723,129 | 2/1998  | Endo et al. . . . . . . . . . . . . . . | 346/1.1 |
|    4,740,796 | 4/1998  | Endo et al. . . . . . . . . . . . . . . | 346/1.1 |
|    4,957,553 | 9/1990  | Koike et al. . . . . . . . . . . . . . | 106/20 |
|    5,213,614 | 5/1993  | Eida et al. . . . . . . . . . . . . . . | 106/22 K |
|    5,215,578 | 6/1993  | Eida et al. . . . . . . . . . . . . . . | 106/22 K --. |

Item [56] FOREIGN PATENT DOCUMENTS

After "4-147866  5/1992  Japan . . . . . . . . . . . . . . . . . . . . . .     347/100" insert

| -- 55-65269  | 5/1980  | Japan. |
|    55-66976  | 5/1980  | Japan. |
|    59-123670 | 7/1984  | Japan. |
|    59-138461 | 8/1984  | Japan. |
|    3-146355  | 6/1991  | Japan. |
|    91/14578  | 10/1991 | WIPO. |
|    0 455 389 | 11/1991 | European Patent Office. |
|    4-158049  | 6/1992  | Japan. |
|    0 517 468 | 12/1992 | European Patent Office. --. |

DISCLOSURE,

Column 6,
Line 45, "is-provided" should read -- is provided --.

Column 9,
Line 17, "designedto" should read -- designed to --.

UNITED STATES PATENT AND TRADEMARK OFFICE
CERTIFICATE OF CORRECTION

PATENT NO. : 6,007,182
DATED : December 28, 1999
INVENTOR(S) : Miyuki Matsubara, et al.

It is certified that error appears in the above-identified patent and that said Letters Patent is hereby corrected as shown below:

Column 10,
Line 2, "composed for example" should read -- composed, for example, --.

Column 29,
Line 46, "the" should read -- a --.

Column 34,
Line 64, "arid" should read -- and --.

Column 36,
Line 11, "claims 31 or 32 to 41," should read -- claims 31 to 44 or 46, --.

Signed and Sealed this

Twenty-fifth Day of September, 2001

*Attest:*

*Attesting Officer*

NICHOLAS P. GODICI
*Acting Director of the United States Patent and Trademark Office*